United States Patent
Im et al.

(10) Patent No.: US 10,101,759 B2
(45) Date of Patent: Oct. 16, 2018

(54) ELECTRONIC CIRCUIT, LINEAR REGULATING CIRCUIT, AND DC-DC CONVERTING CIRCUIT CONSUMING LESS POWER ACCORDING TO CONTROL OF LOGIC CIRCUIT

(71) Applicant: ELECTRONICS AND TELECOMMUNICATIONS RESEARCH INSTITUTE, Daejeon (KR)

(72) Inventors: Jong Pil Im, Daejeon (KR); Jung Hee Suk, Daejeon (KR); Yil Suk Yang, Daejeon (KR); Jimin Oh, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 0 days.

(21) Appl. No.: 15/815,612

(22) Filed: Nov. 16, 2017

(65) Prior Publication Data
US 2018/0231998 A1    Aug. 16, 2018

(30) Foreign Application Priority Data
Feb. 14, 2017  (KR) .................. 10-2017-0020117

(51) Int. Cl.
*H02M 3/15*    (2006.01)
*G05F 1/577*   (2006.01)
(Continued)

(52) U.S. Cl.
CPC .......... *G05F 1/577* (2013.01); *H02M 3/155* (2013.01); *H02M 3/156* (2013.01); *H02M 3/157* (2013.01); *H02M 3/158* (2013.01); *H02M 3/16* (2013.01)

(58) Field of Classification Search
CPC .......................... H02M 3/155–3/158
See application file for complete search history.

(56) References Cited

U.S. PATENT DOCUMENTS

| | | | |
|---|---|---|---|
| 8,957,661 B2 | 2/2015 | Heo et al. | |
| 9,007,039 B2* | 4/2015 | Kim ................ | H02M 3/158 323/267 |

(Continued)

FOREIGN PATENT DOCUMENTS

KR    10-1284976 B1    7/2013

OTHER PUBLICATIONS

Yi Zhang et al., "A Fast-Response Hybrid SIMO Power Converter with Adaptive Current Compensation and Minimized Cross-Regulation", IEEE Journal of Solid-State Circuits, May 2014, pp. 1242-1255, vol. 49, No. 5, IEEE.

(Continued)

*Primary Examiner* — Timothy J Dole
*Assistant Examiner* — Ishrat Jamali

(57) ABSTRACT

Provided are an electronic circuit, a linear regulating circuit, and a DC-DC converting circuit. An embodiment of the inventive concept includes a linear regulating circuit unit for generating, by comparing output voltages and corresponding reference voltages, a transient signal indicating that at least one of the output voltages is in a transient state, or a steady signal indicating that each of the output voltages is in a steady state, and for controlling the output voltages on the basis of the steady signal and the transient signal, an energy storing unit for storing energy used to generate the output voltages, a ground switch unit for controlling connection between the energy storing unit and a ground terminal, an input switch unit for controlling connection between at least (Continued)

one input terminal and the energy storing unit, and an output switch unit for controlling connection between output loads and the energy storing unit.

14 Claims, 17 Drawing Sheets

(51) Int. Cl.

| | | |
|---|---|---|
| *H02M 3/16* | (2006.01) |
| *H02M 3/157* | (2006.01) |
| *H02M 3/155* | (2006.01) |
| *H02M 3/158* | (2006.01) |
| *H02M 3/156* | (2006.01) |

(56) References Cited

U.S. PATENT DOCUMENTS

| | | |
|---|---|---|
| 9,515,552 B2 | 12/2016 | Hung et al. |
| 9,647,554 B1* | 5/2017 | Oh .................... H02M 3/158 |
| 2011/0043181 A1* | 2/2011 | Jing .................... H02M 3/158 323/288 |
| 2012/0169307 A1* | 7/2012 | Chen .................... H02M 3/158 323/271 |
| 2012/0286576 A1* | 11/2012 | Jing .................... H02M 3/156 307/43 |

OTHER PUBLICATIONS

Yu-Huei Lee et al., "Fast Transient (FT) Technique With Adaptive Phase Margin (APM) for Current Mode DC-DC Buck Converters", IEEE Transactions on Very Large Scale Integration (VLSI) Systems, Oct. 2012, pp. 1781-1793, vol. 20, No. 10, IEEE.

Min-Yong Jung et al., "An Error-Based Controlled Single-Inductor 10-Output DC-DC Buck Converter With High Efficiency Under Light Load Using Adaptive Pulse Modulation", IEEE Journal of Solid-State Circuits, Dec. 2015, pp. 2825-2838, vol. 50, No. 12, IEEE.

Jong-Pil Im et al., "Power Efficient Hybrid SIMO Boost Converter for Fast Transient Response and Low Cross Regulation", 2016 IEEE International Conference on Consumer Electronics-Asia, Oct. 26, 2016, pp. 1-3, IEEE.

* cited by examiner

ELECTRONIC CIRCUIT, LINEAR REGULATING CIRCUIT, AND DC-DC CONVERTING CIRCUIT CONSUMING LESS POWER ACCORDING TO CONTROL OF LOGIC CIRCUIT

CROSS-REFERENCE TO RELATED APPLICATION

This U.S. non-provisional patent application claims priority under 35 U.S.C. § 119 to Korean Patent Application No. 10-2017-0020117, filed on Feb. 14, 2017, the entire contents of which are incorporated herein by reference.

STATEMENT REGARDING PRIOR DISCLOSURES BY THE INVENTOR OR A JOINT INVENTOR

On Oct. 26, 2016, an article entitled "Power Efficient Hybrid SIMO Boost Converter for Fast Transient Response and Low Cross Regulation," which names the joint inventors of the present application as authors, was published in conjunction with the 2016 IEEE International Conference on Consumer Electronics-Asia conference in Seoul, South Korea.

BACKGROUND

The present disclosure herein relates to an electronic circuit, and more particularly, to a converting circuit for converting a voltage.

Inside an electronic device, there are loads that require voltages of magnitudes different from each other. To supply the voltages of magnitudes different from each other, a DC-DC converter is included inside the electronic device. The DC-DC converter may have a large number of output terminals to supply the voltages of magnitudes different from each other to the respective loads. The DC-DC converter should store more energy to supply the voltages to a large number of the output terminals. A large number of inductors are required for the DC-DC converter to store much energy. However, an inductor is an element taking up much space in a circuit. Accordingly, it is important in the design of an efficient circuit to reduce the number of inductors.

A single inductor multiple output (SIMO) converter has been devised to reduce the number of inductors constituting a converter. The SIMO converter may supply multiple power sources by using a single inductor. The SIMO converter is classified into a switching regulator converter, and a hybrid converter. The hybrid converter has a switching regulator and a linear regulator as components.

The linear regulator has a fast and stable response characteristic, and does not generate noise. Accordingly, the linear regulator has an excellent transient characteristic. The linear regulator is used in the hybrid converter to complement the switching regulator with a relatively slow response characteristic. However, the linear regulator not only consumes much power but also generates much heat when in operation.

SUMMARY

The present disclosure provides, by using a logic circuit to feedback one or more output voltages, an electronic circuit, a linear regulating circuit, and a DC-DC converting circuit that consume less power.

An embodiment of the inventive concept provides a DC-DC converting circuit including: a linear regulating circuit unit configured to generate, on the basis of a first logical value or a second logical value generated according to a comparison result of output voltages outputted from output terminals and reference voltages respectively corresponding to the output voltages, a transient signal indicating that at least one of the output voltages is in a transient state, or a steady signal indicating that each of the output voltages is in a steady state, and to control the output voltages on the basis of the steady signal and the transient signal; an energy storing unit configured to store energy used to generate the output voltages; a ground switch unit configured to control connection between the energy storing unit and a ground terminal; an input switch unit configured to control connection between at least one input terminal and the energy storing unit; and an output switch unit configured to control connection between the energy storing unit and output loads respectively corresponding to the output terminals.

BRIEF DESCRIPTION OF THE FIGURES

The accompanying drawings are included to provide a further understanding of the inventive concept, and are incorporated in and constitute a part of this specification. The drawings illustrate exemplary embodiments of the inventive concept and, together with the description, serve to describe principles of the inventive concept. In the drawings.

DETAILED DESCRIPTION

Figure 1:
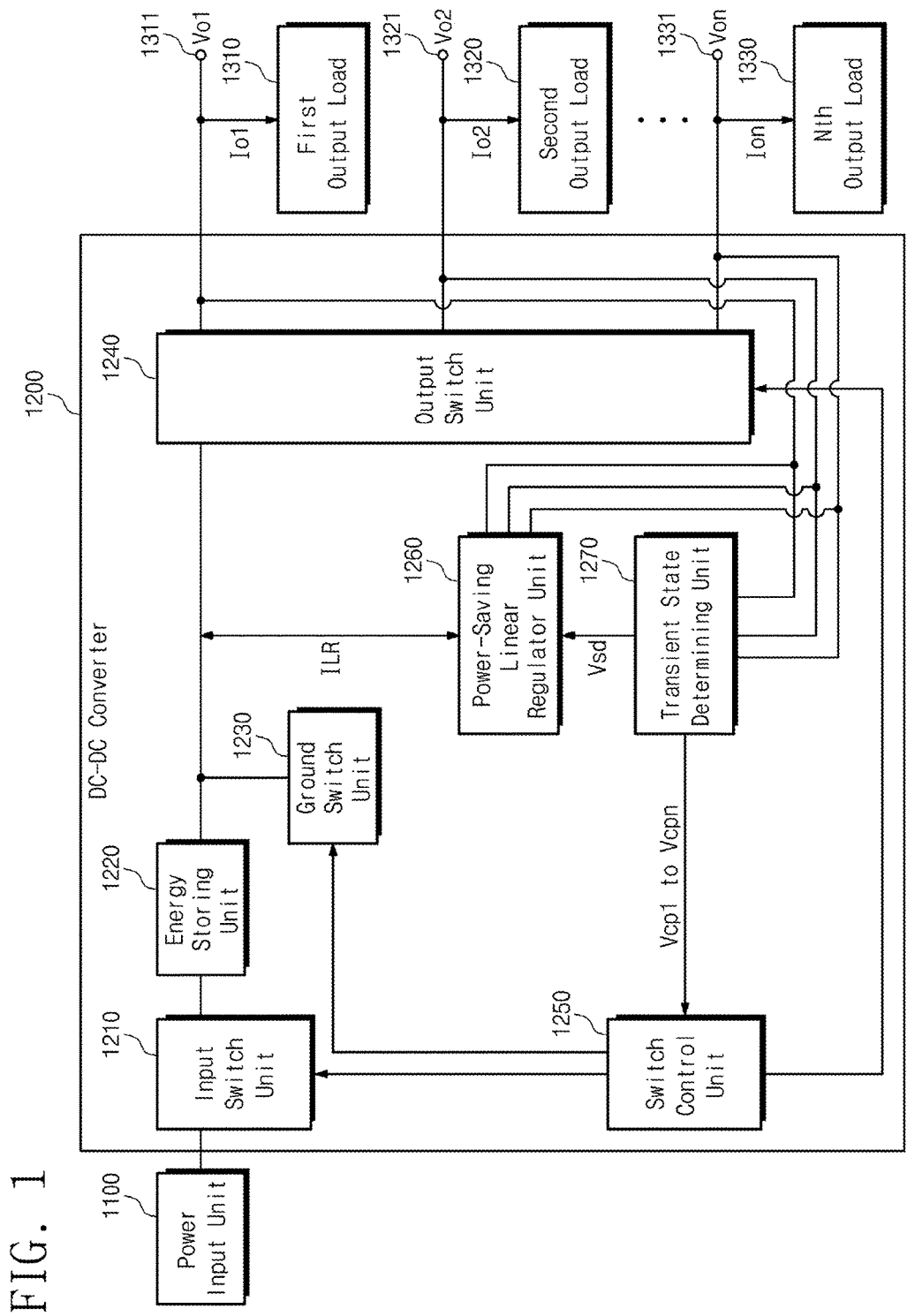
FIG. 1 is a block diagram illustrating an exemplary connection of a DC-DC converter designed according to some embodiments of the inventive concept, a power input unit, and one or more output loads.

Hereinafter, embodiments of the inventive concept are described clearly and in detail such that the inventive concept can be easily carried out by those skilled in the art without departing from the spirit and scope of the inventive concept.

The characteristics described above and detailed descriptions below are all examples to help with the description and understanding of the inventive concept. That is, the inventive concept is not limited to the embodiments, but can be embodied in other forms. The embodiments below are examples only for fully disclosing the inventive concept, and are descriptions to convey the inventive concept to those skilled in the art to which the inventive concept pertains. Thus, it should be understood that, when there are several methods of implementing the components of the inventive concept, the inventive concept can be implemented by a specific method thereof, or by any of equivalents or substitutes.

It will be understood that, when a certain configuration is referred to as including or having specific components, or a certain process is referred to as including or having specific steps in this specification, other components or steps can be further included. That is, the terms used in this specification are only to describe specific embodiments, and are not intended to limit the inventive concept. Furthermore, examples described for better understanding of the inventive concept include complementary embodiments thereof.

The terms used in this specification have general meaning understood by those skilled in the art to which the inventive concept pertains. Commonly used terms should be interpreted in consistent senses according to the context of this specification. In addition, the terms used in this specification, unless the meanings thereof are clearly defined, should not be interpreted in overly ideal or formal senses. Hereinafter, the embodiments of the inventive concept are described with reference to the accompanying drawings.

In this specification, terms "ripple" and "ripple voltage" are used. In the description below, a ripple may mean a periodic signal of a noise component outputted when an input signal is converted through an electronic circuit, or the like. Additionally, a ripple voltage may mean a voltage including the ripple. In this specification, a term "output voltage range" is used. In the description below, an output voltage range may mean a voltage magnitude range of an output voltage changing for one cycle of the ripple when the output voltage is the ripple voltage. In this specification, a term "steady voltage range" is used. In the description below, a steady voltage range is a voltage magnitude range determined on the basis of a reference voltage, and may mean a voltage magnitude range required in an output load, or the like. In this specification, terms "steady state" and "transient state" are used. In the description below, a steady state may mean a state in which the output voltage range is included in the steady voltage range. Additionally, a transient state may mean a state in which the output voltage range is not included in the steady voltage range.

FIG. 1 is a block diagram illustrating an exemplary connection of a DC-DC converter 1200 designed according to some embodiments of the inventive concept, a power input unit 1100, and one or more output loads 1310 to 1330.

Referring to FIG. 1, the DC-DC converter 1200 may include an input switch unit 1210, an energy storing unit 1220, a ground switch unit 1230, an output switch unit 1240, a switch control unit 1250, a power-saving linear regulator unit 1260, and a transient state determining unit 1270.

The DC-DC converter 1200 may receive a DC voltage from the power input unit 1100. The power input unit 1100 may be connected to at least one input terminal of the DC-DC converter 1200. Additionally, the DC-DC converter 1200 may convert the received DC voltage so as to respectively output, to first to nth output terminals 1311 to 1331, first to nth output voltages Vo1 to Von. The outputted first to nth output voltages Vo1 to Von may be inputted respectively to first to nth output loads 1310 to 1330.

In an embodiment of FIG. 1, the input switch unit 1210 may include at least one input switch for controlling connection between the power input unit 1100 and the energy storing unit 1220. The input switch may be constituted of at least one transistor. As an example, the power input unit 1100 may be a device for supplying a DC voltage such as a power supply. The input switch may control connection between the power input unit 1100 and the energy storing unit 1220, on the basis of a signal received from the switch control unit 1250. As an example, in the case that energy transferred from the power input unit 1100 is being stored in the energy storing unit 1220, the input switch unit 1210 may connect the power input unit 1100 and the energy storing unit 1220.

In the embodiment of FIG. 1, the energy storing unit 1220 may include one or more energy storing elements for storing the energy transferred from the power input unit 1100. The energy stored in the energy storing unit 1220 may be used to generate the first to nth output voltages Vo1 to Von. As an example, the energy storing unit 1220 may include energy storing elements such as one or more inductors. The energy storing unit 1220 may be connected to the first to nth output loads 1310 to 1330 through the output switch unit 1240. Alternatively, the energy storing unit 1220 may be disconnected from the first to nth output loads 1310 to 1330 by the output switch unit 1240.

In the embodiment of FIG. 1, the ground switch unit 1230 may include at least one ground switch for controlling connection between the energy storing unit 1220 and a ground terminal. The ground switch may be constituted of at least one transistor. The ground switch may control the connection between the energy storing unit 1220 and the ground terminal, on the basis of a signal received from the switch control unit 1250. As an example, in the case that energy transferred from the power input unit 1100 is being stored in the energy storing unit 1220, the ground switch unit 1230 may connect the energy storing unit 1220 to the ground terminal. As an example, in the case that energy stored in the energy storing unit 1220 is being discharged to the first to nth output loads 1310 to 1330, the ground switch unit 1230 may disconnect the energy storing unit 1220 from the ground terminal.

In the embodiment of FIG. 1, the output switch unit 1240 may include one or more output switches in order to control connection between the energy storing unit 1220 and the power-saving linear regulator unit 1260, and the first to nth output loads 1310 to 1330. Each of the output switches may be constituted of at least one transistor. The respective output switches may control connections between the energy storing unit 1220 and the first to nth output loads 1310 to 1330, on the basis of a signal received from the switch control unit 1250. Additionally, the respective output switches may control connections between the power-saving linear regulator unit 1260 and the first to nth output loads 1310 to 1330 so as to provide paths of regulating current ILR.

As an example, in the case that the energy storing unit 1220 or the power-saving linear regulator unit 1260 is exchanging energy with the first output load 1310 by current, an output switch corresponding to the first output load 1310 may connect the energy storing unit 1220 or the power-saving linear regulator unit 1260 to the first output load 1310. As an example, in the case that the energy storing unit 1220 or the power-saving linear regulator unit 1260 is not exchanging energy with the first output load 1310 by current, the output switch corresponding to the first output load 1310 may disconnect the first output load 1310 from the energy storing unit 1220 or the power-saving linear regulator unit 1260. According to a process described in detail, the first to nth output voltages Vo1 to Von may be outputted from the output switch unit 1240. Output switches respectively corresponding to the second to nth output loads 1320 to 1330 operate in a method similar to that of the output switch corresponding to the first output load 1310, and thus, description thereof will not be given below.

In the embodiment of FIG. 1, the switch control unit 1250 may control the input switch unit 1210, the ground switch unit 1230, and the output switch unit 1240. The switch control unit 1250 may receive first to nth comparison signals Vcp1 to Vcpn having logical values from the transient state determining unit 1270. The switch control unit 1250 may calculate energy to be stored in the energy storing unit 1220, and energy to be transferred to the first to nth output loads 1310 to 1330, on the basis of the first to nth comparison signals Vcp1 to Vcpn. The switch control unit 1250 may calculate time for each of the input switch unit 1210, the ground switch unit 1230, and the output switch unit 1240 to be connected at, on the basis of the calculated energy values. The switch control unit 1250 may output a signal for controlling the connection of each of the input switch unit 1210, the ground switch unit 1230, and the output switch unit 1240, on the basis of the calculation result. The signal for controlling the each connection may be transmitted to a corresponding switch unit among the input switch unit 1210, the ground switch unit 1230, and the output switch unit 1240.

The signals to be transmitted from the switch control unit 1250 to each switch unit may be outputted in response to a clock. The time at which each of the input switch unit 1210, the ground switch unit 1230, and the output switch unit 1240 is connected may be determined on the basis of the signal transmitted from the switch control unit 1250. According to a process described in detail, the first to nth output voltages Vo1 to Von may be generated at the first to nth output terminals 1311 to 1331 respectively. Accordingly, the cycle that the ripples of the first to nth output voltages Vo1 to Von have may be substantially the same as the cycle of the clock.

In the embodiment of FIG. 1, the power-saving linear regulator unit 1260 may transmit the regulating current ILR to the first to nth output loads 1310 to 1330 through the output switch unit 1240. Alternatively, the power-saving linear regulator unit 1260 may receive the regulating current ILR from the first to nth output loads 1310 to 1330 through the output switch unit 1240. The first to nth output voltages Vo1 to Von may be fed back to the power-saving linear regulator unit 1260 from the first to nth output terminals 1311 to 1331 respectively. The magnitudes of the first to nth output voltages Vo1 to Von may be controlled by the regulating current ILR transmitted or received by the power-saving linear regulator unit 1260.

The operation of the power-saving linear regulator unit 1260 may be controlled by the transient state determining unit 1270. The power-saving linear regulator unit 1260 may receive a current control signal Vsd from the transient state determining unit 1270. By the current control signal Vsd, the power-saving linear regulator unit 1260 may not transmit and receive the regulating current ILR in the steady state. Alternatively, by the current control signal Vsd, the power-saving linear regulator unit 1260 may transmit or receive the regulating current ILR in the transient state.

In the embodiment of FIG. 1, the first to nth output voltages Vo1 to Von may be fed back to the transient state determining unit 1270. Additionally, the transient state determining unit 1270 may receive reference voltages respectively corresponding to the first to nth output voltages Vo1 to Von. The transient state determining unit 1270 may compare the first to nth output voltages Vo1 to Von and the reference voltages so as to output the first to nth comparison signals Vcp1 to Vcpn having high or low values. As an example, the transient state determining unit 1270 may include a logic circuit constituted of a logic element. The transient state determining unit 1270 may transmit the first to nth comparison signals Vcp1 to Vcpn to the switch control unit 1250. Additionally, the transient state determining unit 1270 may use the first to nth comparison signals Vcp1 to Vcpn so as to output the current control signal Vsd having a high or low value. The current control signal Vsd may be used to control the operation of the power-saving linear regulator unit 1260.

In the embodiment of FIG. 1, the first to nth output loads 1310 to 1330 may be connected to the DC-DC converter 1200 through the output switch unit 1240. The first output load 1310 may be changed by external conditions. As an example, an external condition may include the magnitude of a load current, an impedance of a load, or the like. The magnitude of the first output voltage Vo1 may change according as the magnitude of a first load current Io1 changes.

The first output voltage Vo1 may include the ripple voltage. For one cycle of the ripple, the first output voltage Vo1 may have a first output voltage range. Additionally, a reference voltage corresponding to the first output voltage Vo1 may have a first steady voltage range. Exemplary determination of the steady voltage range will be described with reference to FIG. 5 below.

As an example, the first output voltage Vo1 may be in the steady state in which the first output voltage range is included in the first steady voltage range. Alternatively, first output voltage Vo1 may be in a higher transient state in which the first output voltage range is higher than the first steady voltage range. Alternatively, the first output voltage Vo1 may be in a lower transient state in which the first output voltage range is lower than the first steady voltage range.

Similar to the first output voltage Vo1 described in detail, the second to nth output voltages Vo2 to Von may include the ripple voltages. For one cycle of the ripple, the magnitudes of the second to nth output voltages Vo2 to Von may respectively change within second to nth output voltage ranges. States that the second to nth output voltages Vo2 to Von may respectively have are similar to the states the first output voltage Vo1 may have, and thus, description thereof will not be given below.

Figure 2:
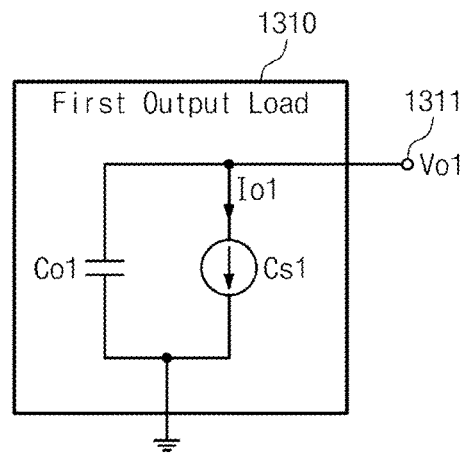
FIG. 2 is a circuit diagram illustrating an exemplary configuration of a first output load illustrated in FIG. 1.

FIG. 2 is a circuit diagram illustrating an exemplary configuration of the first output load 1310 illustrated in FIG. 1. Referring to FIG. 2, the first output load 1310 may include a first capacitor Co1, and a first load current source Cs1. The first capacitor Co1 may be connected in parallel to the first load current source Cs1. One ends of the first capacitor Co1 and the first load current source Cs1 may be connected to a ground terminal. The other ends of the first capacitor Co1 and the first load current source Cs1 may be connected to the first output terminal 1311. The first output voltage Vo1 may be outputted at the first output terminal 1311. The second to nth output loads 1320 to 1330 may also be constituted in a method similar to that of constituting the first output load 1310, and thus, description thereof will not be given below.

Figure 3:
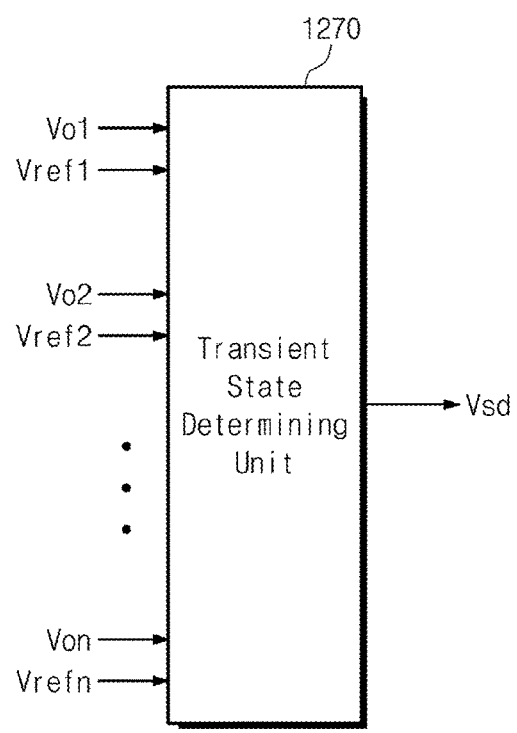
FIG. 3 is a block diagram illustrating an example of input values and an output value of a transient state determining unit illustrated in FIG. 1.

FIG. 3 is a block diagram illustrating an example of input values and an output value of the transient state determining unit 1270 illustrated in FIG. 1. Referring to FIG. 3, the transient state determining unit 1270 may receive the first to nth output voltages Vo1 to Von, and first to nth reference voltages Vref1 to Vrefn respectively corresponding to the first to nth output voltages Vo1 to Von. Additionally, the transient state determining unit 1270 may output the current control signal Vsd for controlling the power-saving linear regulator unit 1260, on the basis of the received first to nth output voltages Vo1 to Von and first to nth reference voltages Vref1 to Vrefn.

Figure 4:
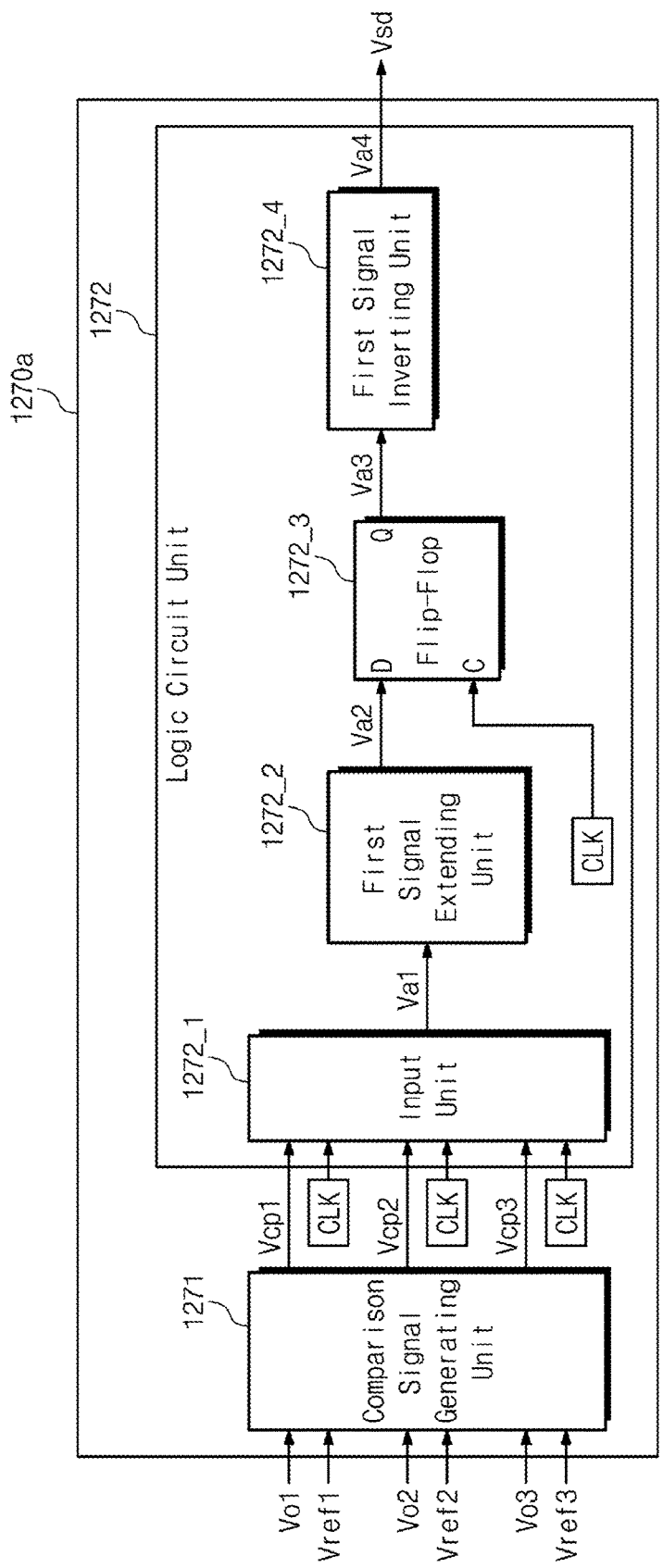
FIG. 4 is a block diagram illustrating a design example of the transient state determining unit illustrated in FIG. 3.

FIG. 4 is a block diagram illustrating a design example of the transient state determining unit 1270 illustrated in FIG. 3. As an example, the transient state determining unit 1270 of FIG. 3 may include a transient state determining unit 1270a of FIG. 4.

In an embodiment of FIG. 4, the transient state determining unit 1270a is illustrated to receive the first to third output voltages Vo1 to Vo3, and the first to third reference voltages Vref1 to Vref3. However, the block diagram illustrated in FIG. 4 is an example for better understanding, and the inventive concept may include all embodiments receiving one or more output voltages and reference voltages. Exemplary configuration and operation of the transient state determining unit are described with reference to FIG. 4 below.

Referring to FIG. 4, the transient state determining unit 1270a may include a comparison signal generating unit 1271 and a logic circuit unit 1272. The first to third output voltages Vo1 to Vo3 may be fed back to the comparison signal generating unit 1271. As an example, the first to nth output voltages Vo1 to Von may be fed back from the first to nth output terminals 1311 to 1331 of the DC-DC converter 1200 to the comparison signal generating unit 1271. Additionally, the comparison signal generating unit 1271 may receive the first to third reference voltages Vref1 to Vref3 respectively corresponding to the first to third output voltages Vo1 to Vo3. As an example, the first to third reference voltages Vref1 to Vref3 may be received from an external component such as a power supply.

The comparison signal generating unit 1271 may compare the first to third output voltages Vo1 to Vo3 and the first to third reference voltages Vref1 to Vref3 so as to output the first to third comparison signals Vcp1 to Vcp3 having certain logical values. Exemplary configuration and operation of the comparison signal generating unit 1271 will be described in FIG. 5 below.

Referring to FIG. 4, the logic circuit unit 1272 may receive the first to third comparison signals Vcp1 to Vcp3, and clocks CLK. As an example, the clocks may be a signal received from an electronic circuit such as a pulse generator. As an example, the clocks may be a signal having substantially constant period and pulse width. As an example, the pulse generator may be an internal component of the DC-DC converter 1200. Alternatively, the pulse generator may be an external component of the DC-DC converter 1200. As an example, logic elements may receive respective clocks from a plurality of pulse generators. Alternatively, the logic elements may receive respective clocks from a single pulse generator.

The logic circuit unit 1272 may perform a logic calculation by using the first to third comparison signals Vcp1 to Vcp3 and logical values of the clocks. The logic circuit unit 1272 may output the current control signal Vsd for controlling the operation of the power-saving linear regulator unit 1260 through the logic calculation. The current control signal Vsd outputted by the logic circuit unit 1272 may be a transient signal indicating that at least one of the first to third output voltages Vo1 to Vo3 is in the transient state. Alternatively, the current control signal Vsd may be a steady signal indicating that each of the first to third output voltages Vo1 to Vo3 is in the steady state. As an example, the transient signal may have a low value. Additionally, the steady signal may have a high value.

Referring to FIG. 4, the logic circuit unit 1272 may include an input unit 1272_1, a first signal extending unit 1272_2, a flip-flop 1272_3, and a first signal inverting unit 1272_4. The input unit 1272_1 may receive the first to third comparison signals Vcp1 to Vcp3, and the clocks. The input unit 1272_1 may perform the logic calculation by using logical values of the received first to third comparison signals Vcp1 to Vcp3 and the clocks. The input unit 1272_1 may output a sum signal Va1 through the logic calculation. Exemplary configuration and operation of the input unit 1272_1 will be described in FIG. 6 below.

Referring to FIG. 4, the first signal extending unit 1272_2 may receive the sum signal Va1 from the input unit 1272_1. The first signal extending unit 1272_2 may output a first extended signal Va2 having pulse widths obtained by extending pulse widths of the received sum signal Va1 by a first length. The first length may be determined by a first delay. Exemplary determination of the first delay will be described in FIG. 7 below. When a sum signal Va1 having a low value is received, the first signal extending unit 1272_2 may output a first extended signal Va2 having a low value. The configuration and operation of the first signal extending unit 1272_2 will be described in FIG. 7 below.

In an embodiment of FIG. 4, the flip-flop 1272_3 may receive the first extended signal Va2 from the first signal extending unit 1272_2 as an input signal D. Additionally, the flip-flop 1272_3 may receive a clock as an input signal C. The flip-flop 1272_3 may output an output signal Q having a high or low value in response to the input signal C. The flip-flop 1272_3 may output the output signal Q as a flip-flop signal Va3. The relation between logical values of the input signal D and the input signal C, and a logical value of the output signal Q is described with reference to Table 1 below.

TABLE 1

| D | C | $Q_{n+1}$ |
|---|---|---|
| 1 | 1 | 1 |
| 0 | 0 | $Q_n$ |
| 1 | 0 | $Q_n$ |
| 0 | 1 | 0 |

In an example of Table 1, $Q_{n+1}$ may be a flip-flop signal Va3 that is currently outputted. $Q_n$ may be a flip-flop signal Va3 that has been previously outputted. "1" and "0" may respectively represent a high value and a low value. Referring to Table 1, $Q_{n+1}$ may have 1 in response to 1 of D and 1 of C. $Q_{n+1}$ may have 0 in response to 0 of D and 1 of C. $Q_{n+1}$ may maintain a logical value of $Q_n$ in response to 0 of C.

Referring to FIG. 4, the first signal inverting unit 1272_4 may receive the flip-flop signal Va3 from the flip-flop 1272_3. The first signal inverting unit 1272_4 may invert the received flip-flop signal Va3 so as to output a first inverted signal Va4. As an example, the first signal inverting unit 1272_4 may be constituted of a logic circuit such as one inverter and odd-numbered inverters connected in series. The first inverted signal Va4 may be outputted from the transient state determining unit 1270a as the current control signal Vsd.

Figure 5:
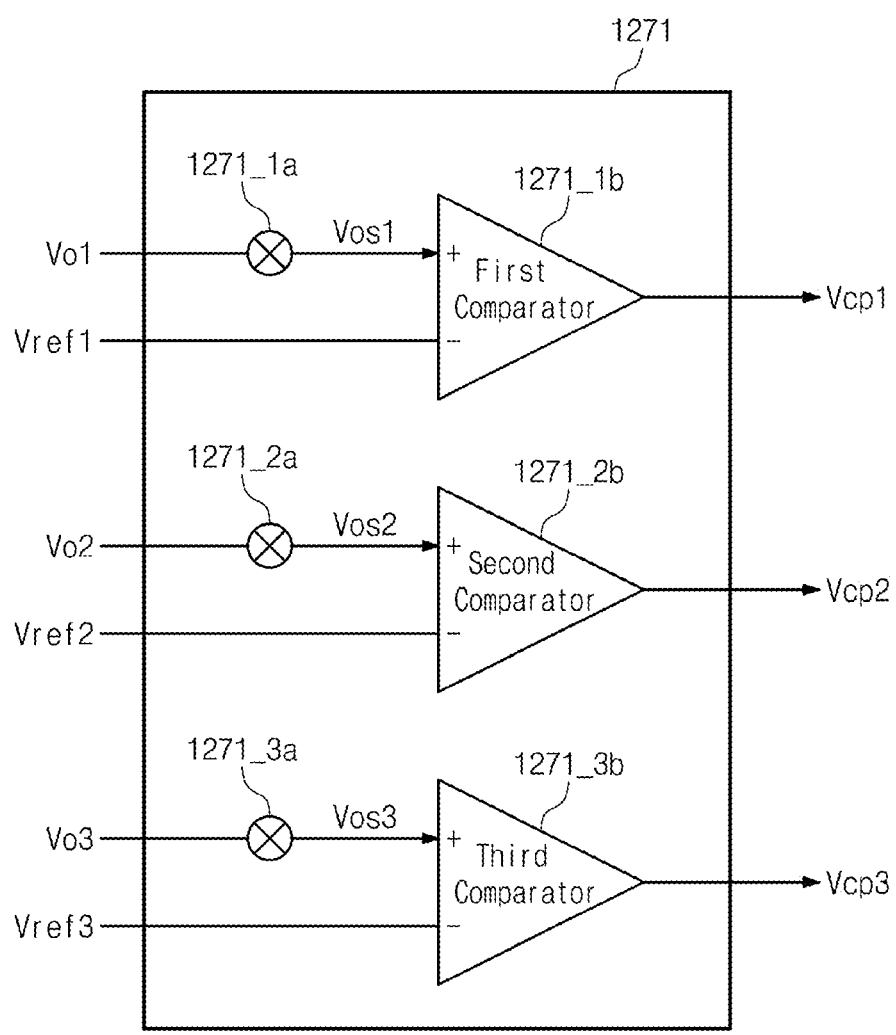
FIG. 5 is a circuit diagram illustrating a design example of a comparison signal generating unit of FIG. 4 according to some embodiments of the inventive concept.

FIG. 5 is a circuit diagram illustrating a design example of the comparison signal generating unit 1271 of FIG. 4. Referring to FIG. 5, the comparison signal generating unit 1271 may include first to third comparison scalers 1271_1a to 1271_3a, and first to third comparators 1271_1b to 1271_3b.

The first to third comparison scalers 1271_1a to 1271_3a may be respectively connected to non-inverting input terminals of the first to third comparators 1271_1b to 1271_3b. The first to third comparison scalers 1271_1a to 1271_3a may respectively scale the first to third output voltages Vo1 to Vo3 such that the first to third output voltages Vo1 to Vo3 respectively corresponding to the first to third comparators 1271_1b to 1271_3b are included in voltage ranges allowed by the first to third comparators 1271_1b to 1271_3b.

The first to third comparison scalers 1271_1a to 1271_3a may output first to third comparison scaled voltages Vos1 to Vos3 through scaling. As an example, the first comparison scaled voltage Vos1 may be substantially equal to the first output voltage Vo1 depending on a scaling ratio. In description below, the operation of the first comparator 1271_1b is described with the first comparison scaled voltage Vos1. The operations of the second to third comparators 1271_2b to 1271_3b are similar to that of the first comparator 1271_1b, and thus, description thereof will not be given below.

Referring to FIG. 5, the first comparator 1271_1b may receive the first comparison scaled voltage Vos1. The first comparator 1271_1b may compare the first comparison scaled voltage Vos1 and the first reference voltage Vref1 so as to output the first comparison signal Vcp1 having a high or low value. As an example, in the case that a voltage magnitude range of the first comparison scaled voltage Vos1 is included in the first steady voltage range within one cycle of a clock, the first comparator 1271_1b may generate a steady comparison signal. The steady comparison signal may be a first comparison signal Vcp1 including pulses of a high value outputted according to the cycle of the clock. As an example, in the case that the voltage magnitude range of the first comparison scaled voltage Vos1 is not included in the first steady voltage range within one cycle of the clock, the first comparator 1271_1b may generate a transient comparison signal. The transient comparison signal may be a first comparison signal Vcp1 having a low value.

The first steady voltage range may be determined by the first comparison scaled voltage Vos1 and the first reference voltage Vref1. As an example, a ripple included in the first comparison scaled voltage Vos1 may have a voltage magnitude range value of Vosr1 for one cycle of the ripple. A value obtained by adding Vosr1 to a magnitude value of the first reference voltage Vref1 may be determined as the upper limit value of the first steady voltage range. Additionally, a value obtained by subtracting Vosr1 from the magnitude value of the first reference voltage Vref1 may be determined as the lower limit value of the first steady voltage range. The operations of the second to third comparators 1271_2b to 1271_3b and exemplary determination of second to third steady voltage ranges are respectively similar to the operation of the first comparator 1271_1b and exemplary determination of first steady voltage range, and thus, description thereof will not be given below.

Figure 6:
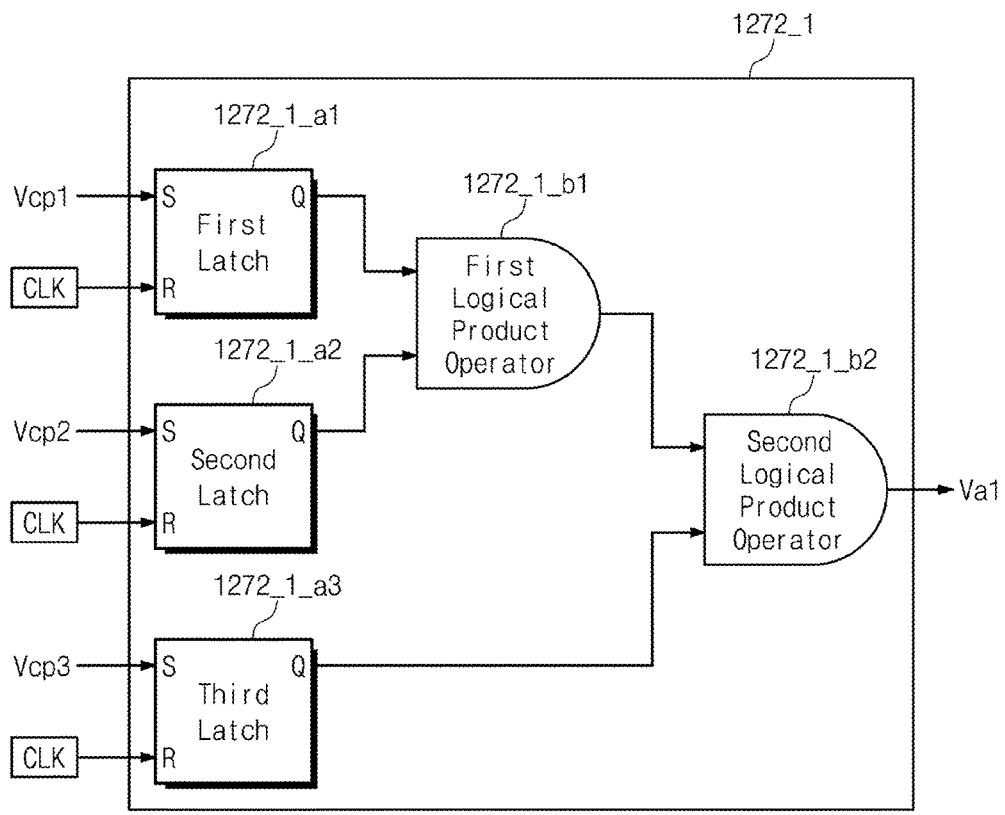
FIG. 6 is a block diagram illustrating a design example of an input unit of FIG. 4.

FIG. 6 is a block diagram illustrating a design example of an input unit 1272_1 of FIG. 4. Referring to FIG. 6, the input unit 1272_1 may include first to third latches 1272_1_a1 to 1272_1_a3, and first to second logical product operators 1272_1_b1 to 1272_1_b2.

The first latch 1272_1_a1 may receive the first comparison signal Vcp1 as an input signal S. Additionally, the first latch 1272_1_a1 may receive a clock as an input signal R. The second latch 1272_1_a2 may receive the second comparison signal Vcp2 as an input signal S. Additionally, the second latch 1272_1_a2 may receive a clock as an input signal R. The third latch 1272_1_a3 may receive the third comparison signal Vcp3 as an input signal S. Additionally, the third latch 1272_1_a3 may receive a clock as an input signal R.

The first logical product operator 1272_1_b1 may receive an output of the first latch 1272_1_a1 and an output of the second latch 1272_1_a2 as input signals. The second logical product operator 1272_1_b2 may receive an output of the first logical product operator 1272_1_b1 and an output of the third latch 1272_1_a3 as input signals. An output of the second logical product operator 1272_1_b2 may be outputted from the input unit 1272_1 as the sum signal Va1.

In an embodiment of FIG. 6, each of the first to third latches 1272_1_a1 to 1272_1_a3 may output an output signal Q having a high or low value in response to the input signal S and the input signal R having a high or low value. An exemplary relation between logical values of the input signal S and the input signal R, and a logical value of the output signal Q is described with reference to Table 2 below.

TABLE 2

| S | R | $Q_{n+1}$ |
|---|---|---|
| 1 | 0 | 1 |
| 0 | 1 | 0 |
| 0 | 0 | $Q_n$ |
| 1 | 1 | 1 |

In an example of Table 2, $Q_{n+1}$ may be an output signal that is currently outputted by one of the first to third latches 1272_1_a1 to 1272_1_a3. $Q_n$ may be an output signal that has been previously outputted by one of the first to third latches 1272_1_a1 to 1272_1_a3. "1" and "0" may respectively represent a high value and a low value. Referring to Table 2, $Q_{n+1}$ may have 1 in response to 1 of S and 0 of R. $Q_{n+1}$ may have 0 in response to 0 of S and 1 of R. $Q_{n+1}$ may maintain a logical value of $Q_n$ in response to 0's of S and R. $Q_{n+1}$ may have 1 in response to 1's of S and R.

In the embodiment of FIG. 6, the first and second logical product operators 1272_1_b1 and 1272_1_b2 may be logic elements for outputting an output signal having a high or low value, on the basis of the input signals each having a high or low value. An exemplary relation between logical values of the input signals and a logical value of the output signal is described with reference to Table 3 below.

TABLE 3

| X | Y | Z |
|---|---|---|
| 1 | 1 | 1 |
| 1 | 0 | 0 |
| 0 | 1 | 0 |
| 0 | 0 | 0 |

Referring to Table 3, X may be one input signal received by one of the first and second logical product operators 1272_1_b1 and 1272_1_b2. Additionally, Y may be the other input signal received by one of the first and second logical product operators 1272_1_b1 and 1272_1_b2. Z may be an output signal outputted by one of the first and second logical product operators 1272_1_b1 and 1272_1_b2. Logical values "1" and "0" may respectively represent a high value and a low value. Referring to Table 3, the output signal Z may have 1 in response to 1's of the input signal X and the input signal Y. The output signal Z may have 0 in response to 0 of the input signal X or the input signal Y.

Figure 7:
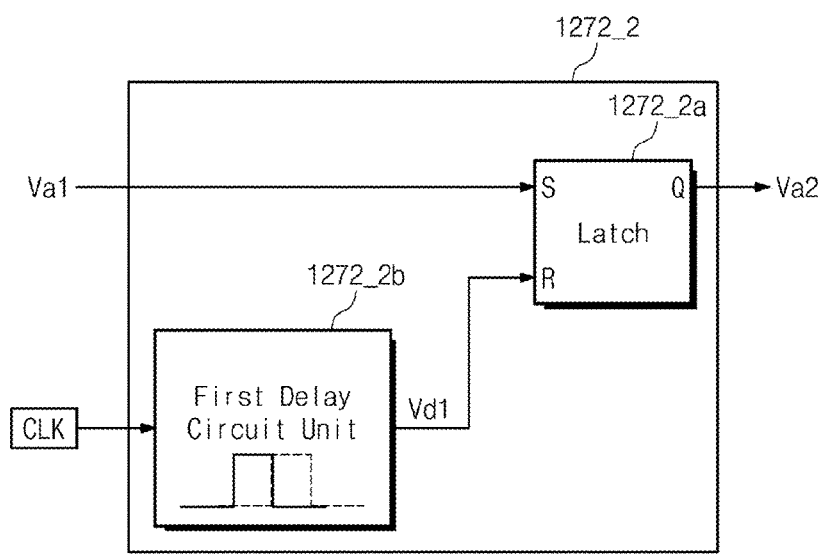
FIG. 7 is a block diagram illustrating a design example of a first signal extending unit of FIG. 4.

FIG. 7 is a block diagram illustrating a design example of the first signal extending unit 1272_2 of FIG. 4. Referring to FIG. 7, the first signal extending unit 1272_2 may include a latch 1272_2a and a first delay circuit unit 1272_2b. The latch 1272_2a may receive the sum signal Va1 as an input signal S. Additionally, the latch 1272_2a may receive a first delayed signal Vd1 from the first delay circuit unit 1272_2b as an input signal R. An output signal Q of the latch 1272_2a may be outputted from the first signal extending unit 1272_2 as the first extended signal Va2. The first delay circuit unit 1272_2b may receive a clock.

In an embodiment of FIG. 7, the first delay circuit unit 1272_2b may delay the received clock by the first delay. The first delay may be determined such that the first extended signal Va2 may respond to a clock in the flip-flop 1272_3. As an example, the first delay may be time for which a high value of the clock is maintained within one cycle of the clock. An exemplary determination of the first delay will be described in more detail with reference to FIG. 11 below.

In the embodiment of FIG. 7, the latch 1272_2a may output the output signal Q having a high or low value in response to the input signal S and the input signal R each having a high or low value. A relation between logical values of the received input signal S and input signal R, and a logical value of the outputted output signal Q is the same as in Table 1, and thus, description thereof will not be given below.

Figure 8:
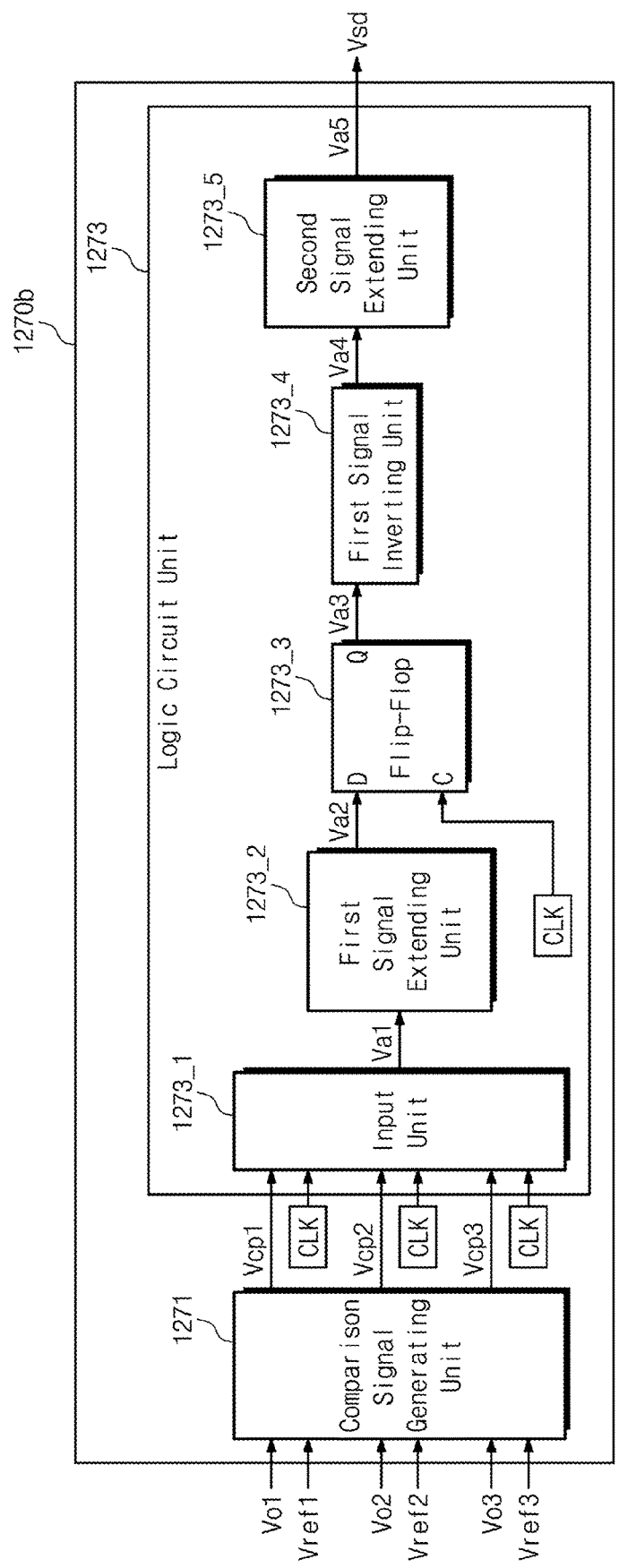
FIG. 8 is a block diagram illustrating a design example of a transient state determining unit further including a second signal extending unit in the transient state determining unit of FIG. 4.

FIG. 8 is a block diagram illustrating a design example of a transient state determining unit 1270b further including a second signal extending unit 1273_5 in the transient state determining unit 1270 of FIG. 4. As an example, the transient state determining unit 1270 of FIG. 3 may include the transient state determining unit 1270b of FIG. 8.

A logic circuit unit 1273 of FIG. 8 may further include the second signal extending unit 1273_5 when compared to the logic circuit unit 1272 of FIG. 4. The configurations and operations of an input unit 1273_1, a first signal extending unit 1273_2, a flip-flop 1273_3, and a first signal inverting unit 1273_4 of the logic circuit unit 1273 are similar to the configurations and operations of the input unit 1272_1, the first signal extending unit 1272_2, the flip-flop 1272_3, and the first signal inverting unit 1272_4 of the logic circuit unit 1272, and thus, description thereof will not be given below.

In an embodiment of FIG. 8, the second signal extending unit 1273_5 may receive the first inverted signal Va4 from the first signal inverting unit 1273_4. The second signal extending unit 1273_5 may output a second extended signal Va5 having pulse widths obtained by respectively extending, by a second length, pulse widths included in the received first inverted signal Va4. The second length may be determined by a second delay. Exemplary determination of the second delay will be described in FIG. 9 below. The second extended signal Va5 may be outputted from the transient state determining unit 1270b as the current control signal Vsd.

When a first inverted signal Va4 having a low value is received, the second signal extending unit 1273_5 may output a second extended signal Va5 having a low value. The configuration and operation of the second signal extending unit 1273_5 is described with reference to FIG. 9 below.

Figure 9:
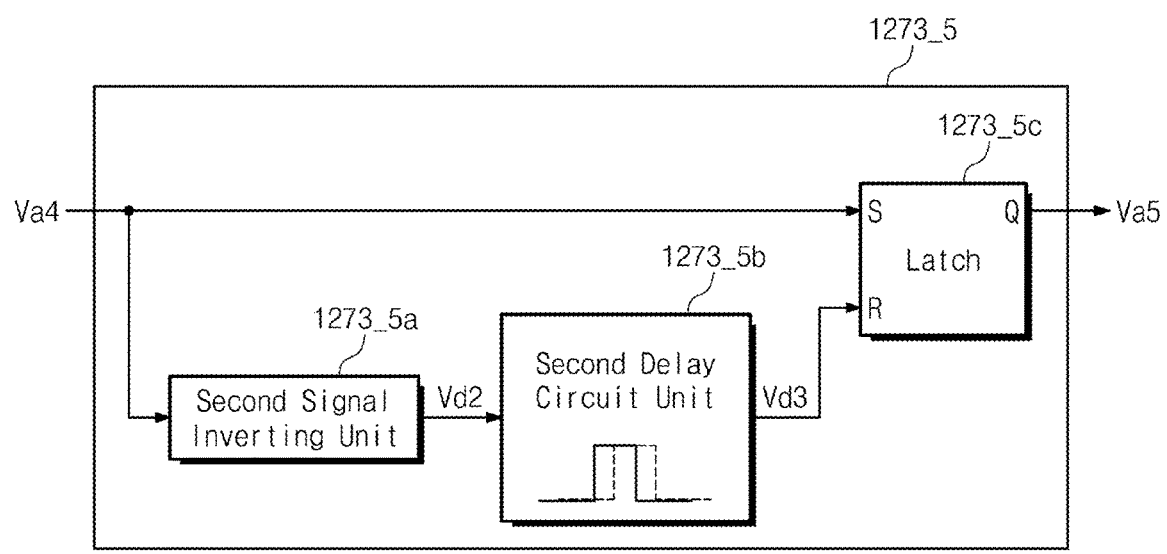
FIG. 9 is a block diagram illustrating a design example of the second signal extending unit of FIG. 8.

FIG. 9 is a block diagram illustrating a design example of the second signal extending unit 1273_5 of FIG. 8, according to some embodiments of the inventive concept. Referring to FIG. 9, the second signal extending unit 1273_5 may include a latch 1273_5c, a second signal inverting unit 1273_5a, and a second delay circuit unit 1273_5b. The second signal inverting unit 1273_5a may receive the first inverted signal Va4. The second signal inverting unit 1273_5a may invert the received first inverted signal Va4 so as to output a second inverted signal Vd2. The second delay circuit unit 1273_5b may receive the second inverted signal Vd2.

The second delay circuit unit 1273_5b may delay the received second inverted signal Vd2 so as to output a second delayed signal Vd3. A delay of the second delayed signal Vd3 may be set such that the first to nth output loads stably re-enter the steady state. As an example, the delay of the second delayed signal Vd3 may be equal to several cycles of a clock.

The latch 1273_5c may receive the first inverted signal Va4 as an input signal S. The latch 1273_5c may receive the second delayed signal Vd3 as an input signal R. The latch 1273_5c may output the second extended signal Va5. The latch 1273_5c may output an output signal Q having a high or low value in response to the input signal S and the input signal R. The output signal Q of the latch 1273_5c may be outputted from the second signal extending unit 1273_5 as the second extended signal Va5. The relation between logical values of the received input signal S and input signal R, and logical value of the outputted output signal Q is the same as in Table 1, and thus, description thereof will not be given below.

Figure 10:
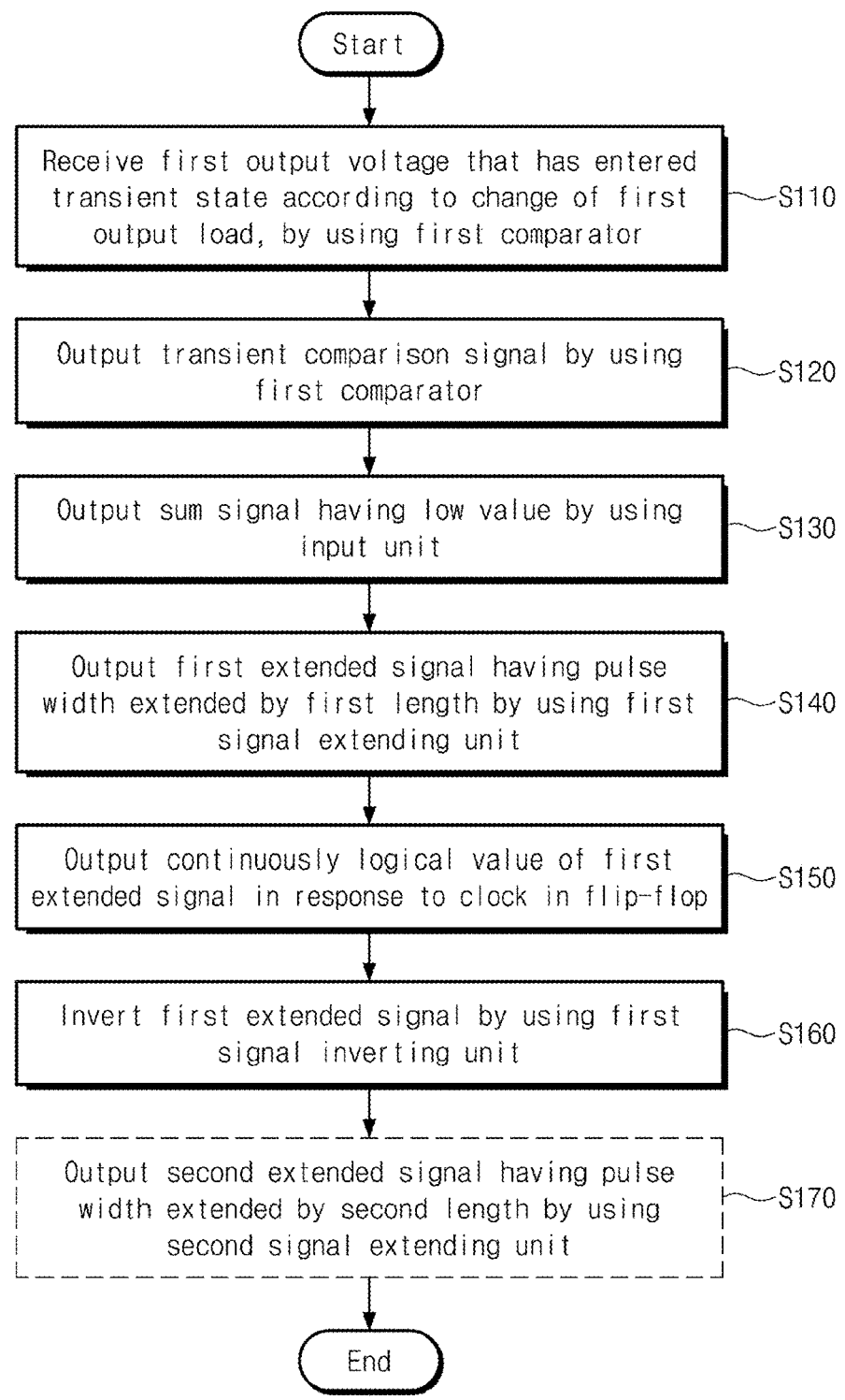
FIG. 10 is a flow chart illustrating an exemplary operation of the transient state determining unit in the case that a first output voltage has entered a transient state.

FIG. 10 is a flow chart illustrating an exemplary operation of the transient state determining unit 1270a or 1270b in the case that the first output voltage Vo1 has entered the transient state. For better understanding, FIGS. 1, 5, and 8 will be referred to together with FIG. 10.

In step S110, the first output voltage Vo1 may enter the transient state according to the change of the first output load 1310. The transient state may be the higher transient state or the lower transient state. As an example, the second and third output voltages Vo2 and Vo3 may be in the steady state. The first comparator 1271_1b may receive the first output voltage Vo1 that has entered the transient state.

In step S120, the first comparator 1271_1b may output the first comparison signal Vcp1. As an example, the first comparison signal Vcp1 may be a transient comparison signal having a low value for one cycle of a clock. The second and third comparators 1271_2b and 1271_3b may output the second and third comparison signals Vcp2 and Vcp3. As an example, the second and third comparison signals Vcp2 and Vcp3 may be steady comparison signals including pulses of a high value outputted according to the cycle of a clock.

In step S130, the input unit 1272_1 or 1273_1 may receive the first to third comparison signals Vcp1 to Vcp3 outputted in step S120. The input unit 1272_1 or 1273_1 may output a sum signal Va1 having a low value in response to the first comparison signal Vcp1 that is the transient signal.

In step S140, the first signal extending unit 1272_2 or 1273_2 may receive the sum signal Va1 outputted in step S130. The first signal extending unit 1272_2 or 1273_2 may extend the pulse width of the sum signal Va1 by the first length so as to output the first extended signal Va2.

In step S150, the flip-flop 1272_3 or 1273_3 may receive the first extended signal Va2 outputted in step S140, and a clock. The flip-flop 1272_3 or 1273_3 may store a low value of the first extended signal Va2 for one cycle of the clock, in response to the clock. The flip-flop 1272_3 or 1273_3 may continuously output a flip-flop signal Va3 having the stored low value for one cycle of the clock.

In step S160, the first signal inverting unit 1272_4 or 1273_4 may receive the flip-flop signal Va3 outputted in step S150. The first signal inverting unit 1272_4 or 1273_4 may invert the received flip-flop signal Va3 so as to output the first inverted signal Va4.

In step S170, the second signal extending unit 1273_5 may receive the first inverted signal Va4 outputted in step S160. The second signal extending unit 1273_5 may output the second extended signal Va5 that is obtained by extending the pulse width of the first inverted signal Va4 by the second length. In the case of the transient state determining unit 1270a, operations of FIG. 10 may end without performing step S170.

Figure 11:
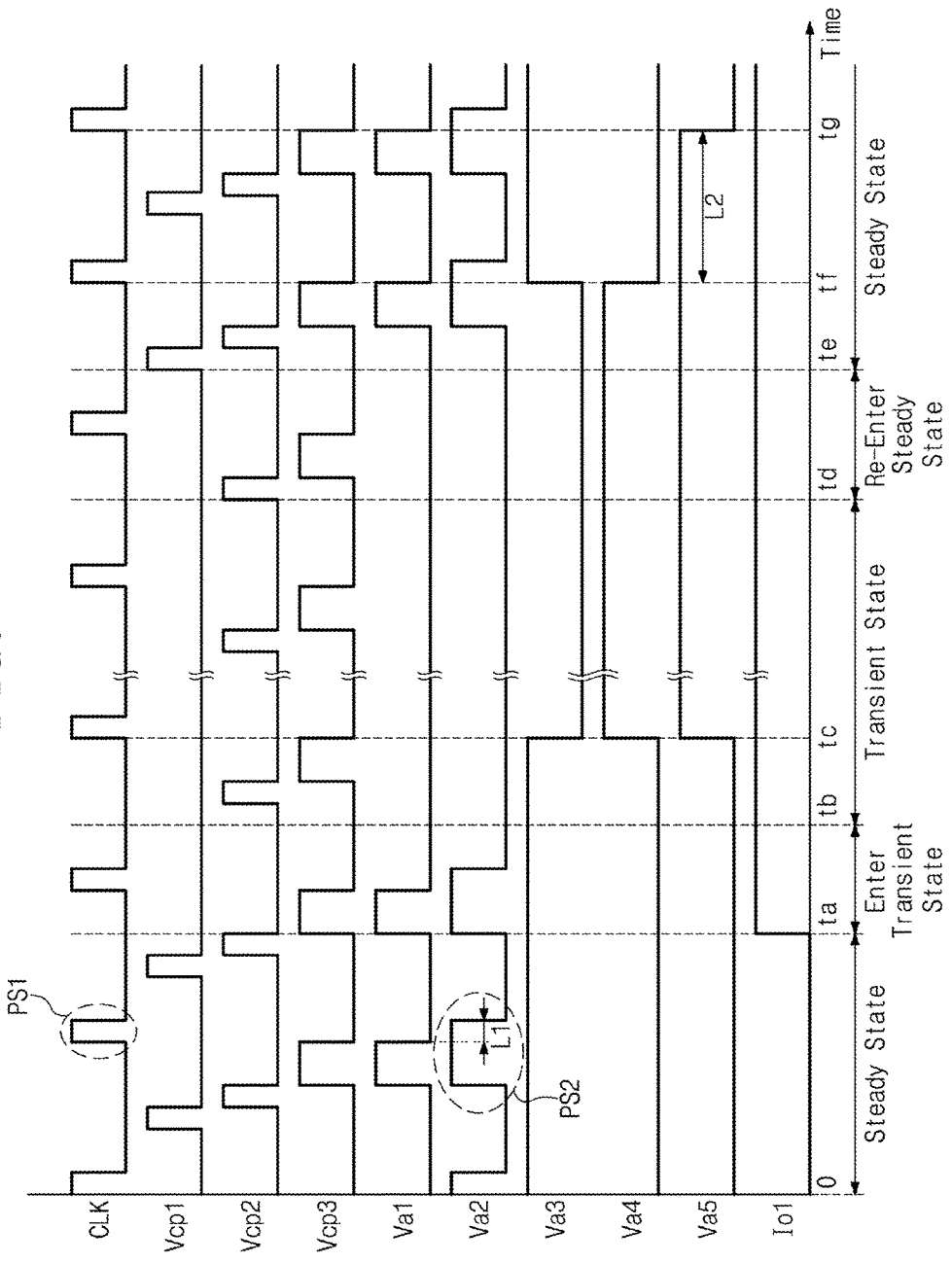
FIG. 11 is a timing diagram illustrating the changes of signals over time in the transient state determining unit designed according to some embodiments of the inventive concept.

FIG. 11 is a timing diagram illustrating the changes of signals over time in the transient state determining unit 1270b designed according to some embodiments of the inventive concept. For better understanding, FIG. 8 will be referred to together with FIG. 11.

Hereinafter, described are the changes of the magnitudes of internal signals of the transient state determining unit 1270a or 1270b, the clock CLK, and the first load current Io1, with reference to FIG. 11. The transient state determining unit 1270a of FIG. 4 may not include the second signal extending unit 1273_5 of FIG. 8. Accordingly, description about the second extended signal Va5, when FIG. 11 is described below, may be applied only to the transient state determining unit 1270b of FIG. 8.

Before timing ta, the first to third output voltages Vo1 to Vo3 may be in the steady state. The first to third comparison signals Vcp1 to Vcp3 may respectively include pulses different from each other having a cycle substantially the same as that of the clock CLK.

Within one cycle of the clock CLK, the sum signal Va1 including pulses may be outputted in response to the first to third comparison signals Vcp1 to Vcp3. Within one cycle of the clock CLK, a first extended signal Va2 having a pulse width obtained by extending the pulse width of the sum signal Va1 by a first length L1 may be outputted.

In an example of FIG. 11, the first length L1 may be determined such that a pulse PS2 of the first extended signal Va2 may respond to a pulse PS1 of the clock CLK. Accordingly, the first delay may be determined to be substantially equal to time for which a pulse of the first length L1 has a high value.

In response to the clock CLK, the flip-flop signal Va3 may have a high value of the first extended signal Va2 for one cycle of the clock CLK. Accordingly, a flip-flop signal Va3 having the high value may be continuously outputted for one cycle of the clock CLK. The first inverted signal Va4 may be outputted that is an inverted flip-flop signal Va3. The second extended signal Va5 substantially the same as the first inverted signal Va4 may be outputted according to a low value of the first inverted signal Va4.

At timing ta, the magnitude of the first load current Io1 may increase. According as the magnitude of the first load current Io1 changes, the first output voltage Vo1 may enter the transient state at a certain point between timing ta and timing tb. In response to the transient state of the first output voltage Vo1, a first comparison signal Vcp1 having a low value may be continuously outputted. The second and third comparison signals Vcp2 and Vcp3, the sum signal Va1, the first extended signal Va2, the flip-flop signal Va3, the first inverted signal Va4, and the second extended signal Va5 may be maintained the same as before timing ta, and thus, description thereof will not be given below.

Between timing tb and timing td, the first output voltage Vo1 may be in the transient state. In response to the transient state of the first output voltage Vo1, a first comparison signal Vcp1 having a low value may be continuously outputted. In response to the first comparison signal Vcp1, a sum signal Va1 having a low value may be continuously outputted. In response to the sum signal Va1, a first extended signal Va2 having a low value may be continuously outputted.

After timing tc, the flip-flop signal Va3 may have the low value of the first extended signal Va2 for one cycle of the clock CLK in response to the clock CLK. Accordingly, the flip-flop signal Va3 having a low value may be continuously outputted for one cycle of the clock CLK. The first inverted signal Va4 may be outputted that is an inverted flip-flop signal Va3. Between timing tb and timing tc, the second extended signal Va5 substantially the same as the first inverted signal Va4 may be outputted in response to a first inverted signal Va4 having a low value. The second and third comparison signals Vcp2 and Vcp3 are maintained the same as before timing tb, and thus, description thereof will not be given below.

The first output voltage Vo1 may re-enter the steady state at a certain point between timing td and timing te. Because the first comparison signal Vcp1 has not responded to the first output voltage Vo1 by the clock CLK in the steady state at the certain point, internal signals of the transient state determining unit 1270b are maintained the same as between timing tc and timing td, and thus, description thereof will not be given below.

In response to the first inverted signal Va4 between timing tc and timing tf, a second extended signal Va5 may be outputted having a pulse width obtained by extending the pulse width of the first inverted signal Va4 by a second length L2. The first to third comparison signals Vcp1 to Vcp3, the sum signal Va1, the first extended signal Va2, the flip-flop signal Va3, and the first inverted signal Va4 have waveforms the same as before timing ta, and thus, description thereof will not be given below.

The first inverted signal Va4 may be outputted from the transient state determining unit 1270a as the current control signal Vsd. Alternatively, the second extended signal Va5 may be outputted from the transient state determining unit 1270*b* as the current control signal Vsd. Through the processes described in detail, the current control signal Vsd having logical values different from each other in the steady state and the transient state may be outputted from the transient state determining unit 1270*a* or the transient state determining unit 1270*b*. Additionally, the current control signal Vsd may be outputted in response to the first to third comparison signals Vcp1 to Vcp3 in a small number of cycles of the clock. Accordingly, the power-saving linear regulator unit 1260 of FIG. 1 controlled by using the current control signal Vsd may have an improved transient characteristic.

Figure 12:
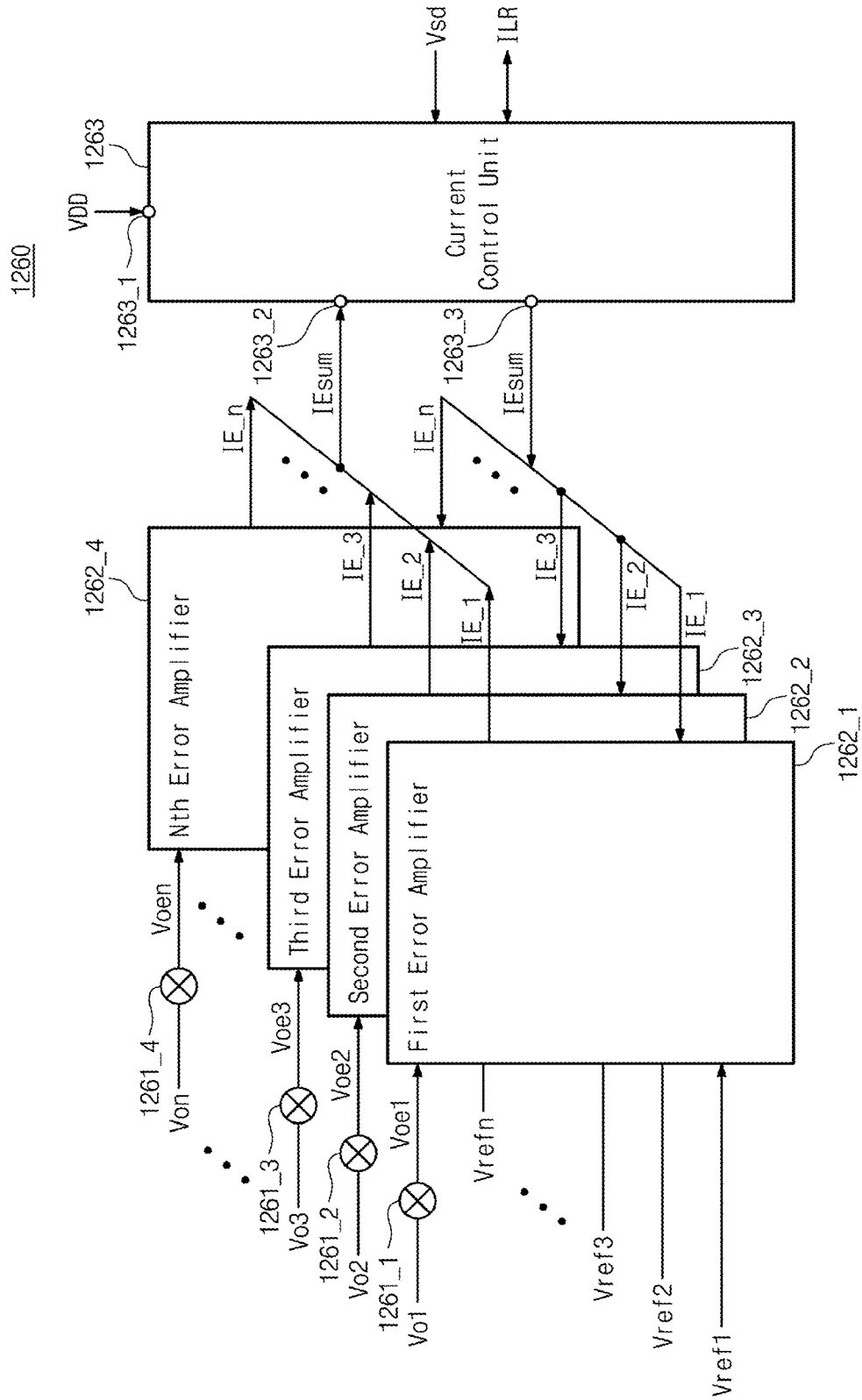
FIG. 12 is a block diagram illustrating a design example of a power-saving linear regulator unit illustrated in FIG. 1.

FIG. 12 is a block diagram illustrating a design example of the power-saving linear regulator unit 1260 illustrated in FIG. 1. Referring to FIG. 12, the power-saving linear regulator unit 1260 may include first to nth error scalers 1261_1 to 1261_4, first to nth error amplifiers 1262_1 to 1262_4, and a current control unit 1263.

The first to nth output voltages Vo1 to Von may be fed back respectively to the first to nth error scalers 1261_1 to 1261_4. As an example, the first to nth output voltages Vo1 to Von may be fed back from the first to nth output terminals 1311 to 1331 of the DC-DC converter 1200 to the first to nth error scalers 1261_1 to 1261_4. The first to nth error scalers 1261_1 to 1261_4 may be respectively connected to the first to nth error amplifiers 1262_1 to 1262_4. The first to nth error scalers 1261_1 to 1261_4 may scale the magnitudes of voltages such that the magnitudes of the first to nth output voltages Vo1 to Von are included in voltage ranges allowed respectively by the first to nth error amplifiers 1262_1 to 1262_4. The first to nth error scalers 1261_1 to 1261_4 may respectively output first to nth error scaled voltages Voe1 to Voen.

In an embodiment of FIG. 12, the first to nth error amplifiers 1262_1 to 1262_4 may respectively receive the first to nth error scaled voltages Voe1 to Voen. Additionally, the first to nth error amplifiers 1262_1 to 1262_4 may receive the first to nth reference voltages Vref1 to Vrefn respectively corresponding to the first to nth output voltages Vo1 to Von. As an example, the first to nth reference voltages Vref1 to Vrefn may be received from an external component such as a power supply.

The first to nth error amplifiers 1262_1 to 1262_4 may respectively compare the first to nth output voltages Vo1 to Von and the first to nth reference voltages Vref1 to Vrefn so as to output first to nth error information currents IE_1 to IE_n. As an example, the magnitudes of the first to nth error information currents IE_1 to IE_n may be related to the respective differences of the magnitudes of the first to nth output voltages Vo1 to Von and the magnitudes of the first to nth reference voltages Vref1 to Vrefn. The first to nth error amplifiers 1262_1 to 1262_4 may transmit the first to nth error information currents IE_1 to IE_n to the current control unit 1263. Alternatively, the first to nth error amplifiers 1262_1 to 1262_4 may receive the first to nth error information currents IE_1 to IE_n from the current control unit 1263. Error information current IEsum may be generated by summing the first to nth error information currents IE_1 to IE_n.

Referring to FIG. 12, the current control unit 1263 may receive a bias voltage VDD through a bias voltage terminal 1263_1. As an example, the bias voltage VDD may be received from an external device such as a power supply.

The current control unit 1263 may receive the error information current IEsum through a current reception terminal 1263_2. Alternatively, the current control unit 1263 may transmit the error information current IEsum through a current transmission terminal 1263_3. The magnitude of the regulating current ILR may be determined by the current control unit 1263 on the basis of the magnitude of the received or transmitted error information current IEsum. The current control unit 1263 may transmit the regulating current ILR with the determined magnitude to at least one of the first to nth output loads 1310 to 1330. Alternatively, the current control unit 1263 may receive the regulating current ILR with the determined magnitude from at least one of the first to nth output loads 1310 to 1330. The configuration and operation of the current control unit 1263 are described with reference to FIGS. 13 to 14C below.

Figure 13:
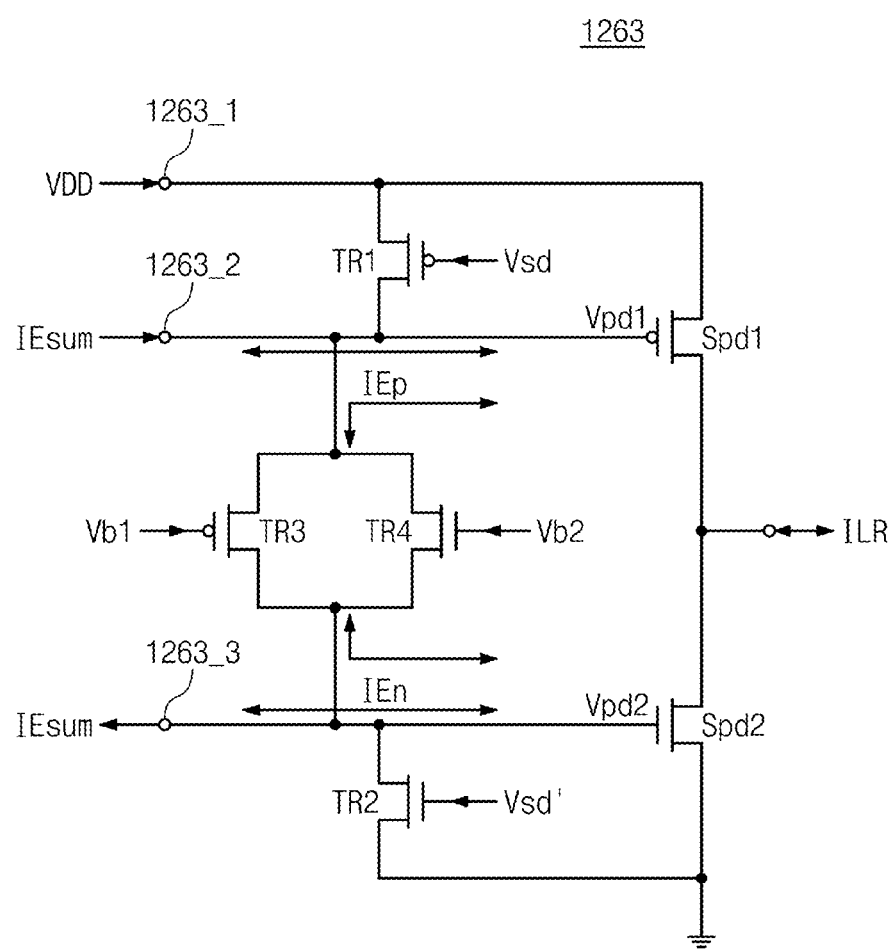
FIG. 13 is a circuit diagram illustrating a design example of a current control unit of FIG. 12.

FIG. 13 is a circuit diagram illustrating a design example of the current control unit 1263 of FIG. 12. Referring to FIG. 13, the current control unit 1263 may include a class-AB amplifier structure.

The class-AB amplifier structure may output the regulating current ILR on the basis of the error information current IEsum. For operation of the class-AB amplifier structure, third and fourth control switches TR3 and TR4 may be configured as a transmission gate structure. The transmission gate structure may provide paths of p-error information current IEp and n-error information current IEn inside the current control unit 1263. Additionally, the class-AB amplifier structure may include a push-pull stage structure for transmission and reception of the regulating current ILR. The push-pull stage structure may be constituted of first and second cut-off switches Spd1 and Spd2. Hereinafter, a detailed connection relation is described of the circuit diagram illustrated in FIG. 13.

Referring to FIG. 13, the current control unit 1263 may include first to fourth control switches TR1 to TR4, and the first to second cut-off switches Spd1 to Spd2. The first to fourth control switches TR1 to TR4, and the first to second cut-off switches Spd1 to Spd2 may be constituted of MOSFETs. As an example, the first control switch TR1, the third control switch TR3, and the first cut-off switch Spd1 may be constituted of a PMOSFET. As an example, the second control switch TR2, the fourth control switch TR4, and the second cut-off switch Spd2 may be constituted of an NMOSFET.

Referring to FIG. 13, the bias voltage VDD may be received through the bias voltage terminal 1263_1. One end of the first control switch TR1 may be connected to the bias voltage terminal 1263_1. Additionally, the other end of the first control switch TR1 may be connected to the current reception terminal 1263_2.

The third and fourth control switches TR3 and TR4 may be connected in parallel. One end of the third and fourth control switches TR3 and TR4 may be connected to the current reception terminal 1263_2. Additionally, the other end of the third and fourth control switches TR3 and TR4 may be connected to the current transmission terminal 1263_3.

One end of the second control switch TR2 may be connected to the current transmission terminal 1263_3. Additionally, the other end of the second control switch TR2 may be connected to the ground terminal.

The first and second cut-off switches Spd1 and Spd2 may be connected in series. One end of the first cut-off switch Spd1 may be connected to the bias voltage terminal 1263_1. One end of the second cut-off switch Spd2 may be connected to the ground terminal. A gate of the first cut-off switch Spd1 may be connected to the current reception terminal 1263_2.

A gate of the second cut-off switch Spd2 may be connected to the current transmission terminal 1263_3.

Referring to FIG. 13, the first control switch TR1 may receive the current control signal Vsd through a gate. The second control switch TR2 may receive an inverted current control signal Vsd' through a gate. The third control switch TR3 may receive a first operation signal Vb1 for operation of the transmission gate structure through a gate. The fourth control switch TR4 may receive a second operation signal Vb2 for operation of the transmission gate structure through a gate. Each of the first and second operation signals Vb1 and Vb2 may have a high value or a low value.

The first and second operation signals Vb1 and Vb2 may be related to the current control signal Vsd. As an example, when the current control signal Vsd is the steady signal, the first operation signal Vb1 may have the high value. Additionally, the second operation signal Vb2 may have the low value. As an example, when the current control signal Vsd is the transient signal, the first operation signal Vb1 may have the low value. Additionally, the second operation signal Vb2 may have the high value.

The first cut-off switch Spd1 may receive a first cut-off voltage Vpd1 through a gate. The first cut-off voltage Vpd1 may be controlled by the p-error information current IEp that is transmitted or received through the gate of the first cut-off switch Spd1. The second cut-off switch Spd2 may receive a second cut-off voltage Vpd2 through a gate. The second cut-off voltage Vpd2 may be controlled by the n-error information current IEn that is transmitted or received through the gate of the second cut-off switch Spd2. The regulating current ILR may be transmitted or received at a node between the first cut-off switch Spd1 and the second cut-off switch Spd2.

Figure 14A:
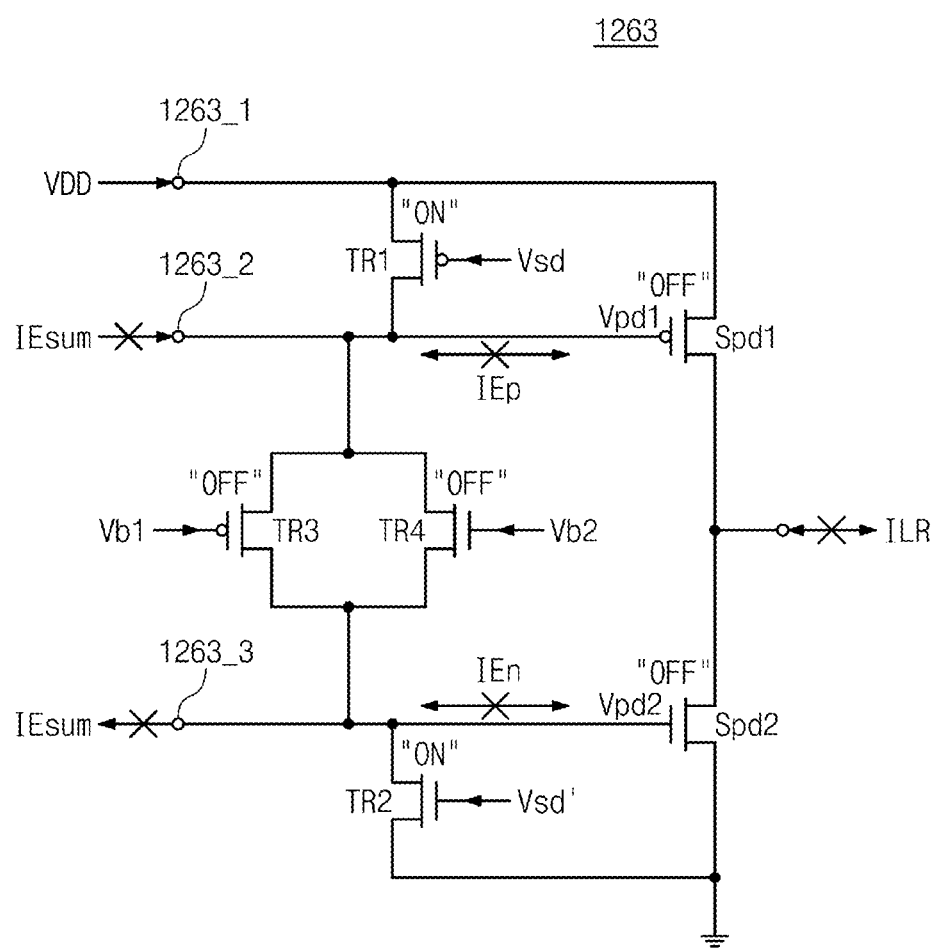
FIG. 14A is a circuit diagram illustrating an exemplary operation, in a steady state, of the current control unit illustrated in FIG. 13.

FIG. 14A is a circuit diagram illustrating an exemplary operation, in the steady state, of the current control unit 1263 illustrated in FIG. 13. In an embodiment of FIG. 14A, the current control signal Vsd may be the steady signal. The first operation signal Vb1 may have a high value. Additionally, the second operation signal Vb2 may have a low value.

The first and second control switches TR1 and TR2 may be turned on by the current control signal Vsd and the inverted current control signal Vsd'. Accordingly, the gate of the first cut-off switch Spd1 may be connected to the bias voltage terminal 1263_1 through the first control switch TR1. The first cut-off switch Spd1 may receive the bias voltage VDD through the first control switch TR1 as the first cut-off voltage Vpd1. Additionally, the gate of the second cut-off switch Spd2 may be connected to the ground terminal through the second control switch TR2. The second cut-off switch Spd2 may receive a voltage of the ground terminal through the second control switch TR2 as the second cut-off voltage Vpd2.

The third and fourth control switches TR3 and TR4 may be turned off by the first and second operation signals Vb1 and Vb2. The error information current IEsum that is received and transmitted respectively through the current reception terminal 1263_2 and the current transmission terminal 1263_3 may be cut off by the first to nth error amplifiers 1262_1 to 1262_4 of FIG. 12. Accordingly, the transmission and reception of the p-error information current IEp and the n-error information current IEn may be cut off.

The first and second cut-off switches Spd1 and Spd2 may be turned off by the first and second cut-off voltages Vpd1 and Vpd2. The transmission and reception of the regulating current ILR may be cut off by turning off the first and second cut-off switches Spd1 and Spd2. In the steady state, because the first and second cut-off switches Spd1 and Spd2 are turned off, the current control unit 1263 may consume less power.

Figure 14B:
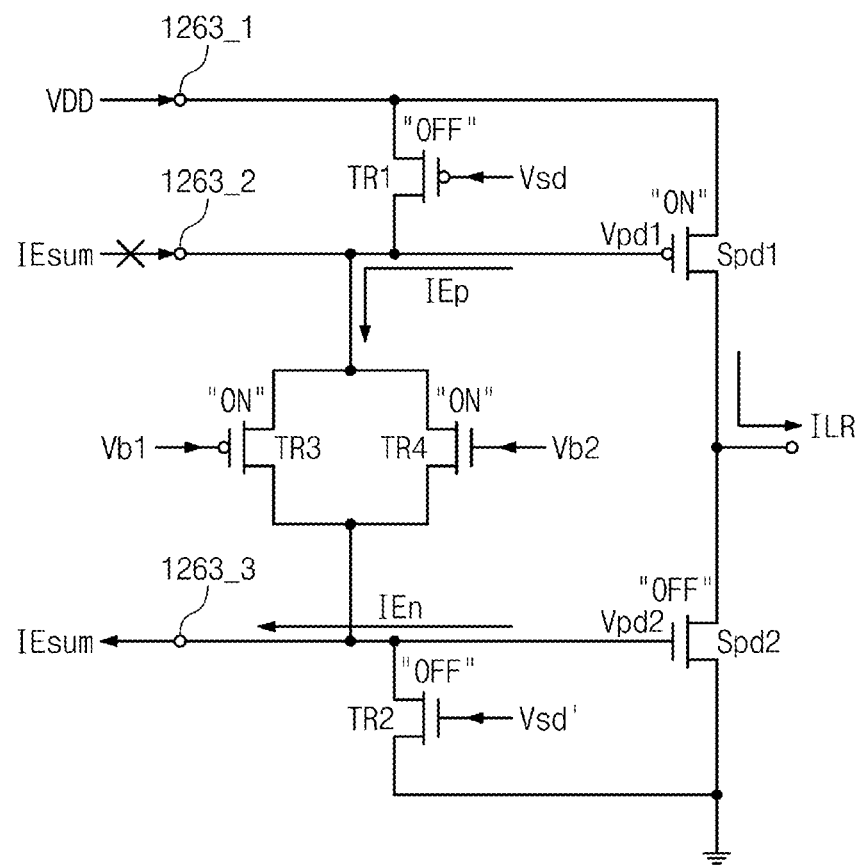
FIG. 14B is a circuit diagram illustrating an exemplary operation, in a lower transient state, of the current control unit illustrated in FIG. 13.

FIG. 14B is a circuit diagram illustrating an exemplary operation, in the lower transient state, of the current control unit 1263 illustrated in FIG. 13. In an embodiment of FIG. 14B, the current control signal Vsd may be the transient signal. Additionally, the first and second operation signals Vb1 and Vb2 may have high values.

The first and second control switches TR1 and TR2 may be turned off by the current control signal Vsd and the inverted current control signal Vsd'. The third and fourth control switches TR3 and TR4 may be turned on by the first and second operation signals Vb1 and Vb2. The error information current IEsum that is received through the current reception terminal 1263_2 may be cut off by the first to nth error amplifiers 1262_1 to 1262_4 of FIG. 12. Additionally, the error information current IEsum may be transmitted to the first to nth error amplifiers 1262_1 to 1262_4 by the first to nth error amplifiers 1262_1 to 1262_4 through the current transmission terminal 1263_3.

The p-error information current IEp may be transmitted from the gate of the first cut-off switch Spd1 through the third and fourth control switches TR3 and TR4 to the current transmission terminal 1263_3, by the transmitted error information current IEsum. Additionally, the n-error information current IEn may be transmitted from the gate of the second cut-off switch Spd2 to the current transmission terminal 1263_3. The error information current IEsum may include the p-error information current IEp and the n-error information current IEn. The magnitudes of the first and second cut-off voltages Vpd1 and Vpd2 may be decreased by the transmitted p-error information current IEp and n-error information current IEn.

As the magnitude of the first cut-off voltage Vpd1 decreases, the first cut-off switch Spd1 may be turned on. As the magnitude of the second cut-off voltage Vpd2 decreases, the second cut-off switch Spd2 may be turned off. The regulating current ILR may be transmitted through the first cut-off switch Spd1 from the current control unit 1263 to at least one of the first to nth output loads 1310 to 1330.

Figure 14C:
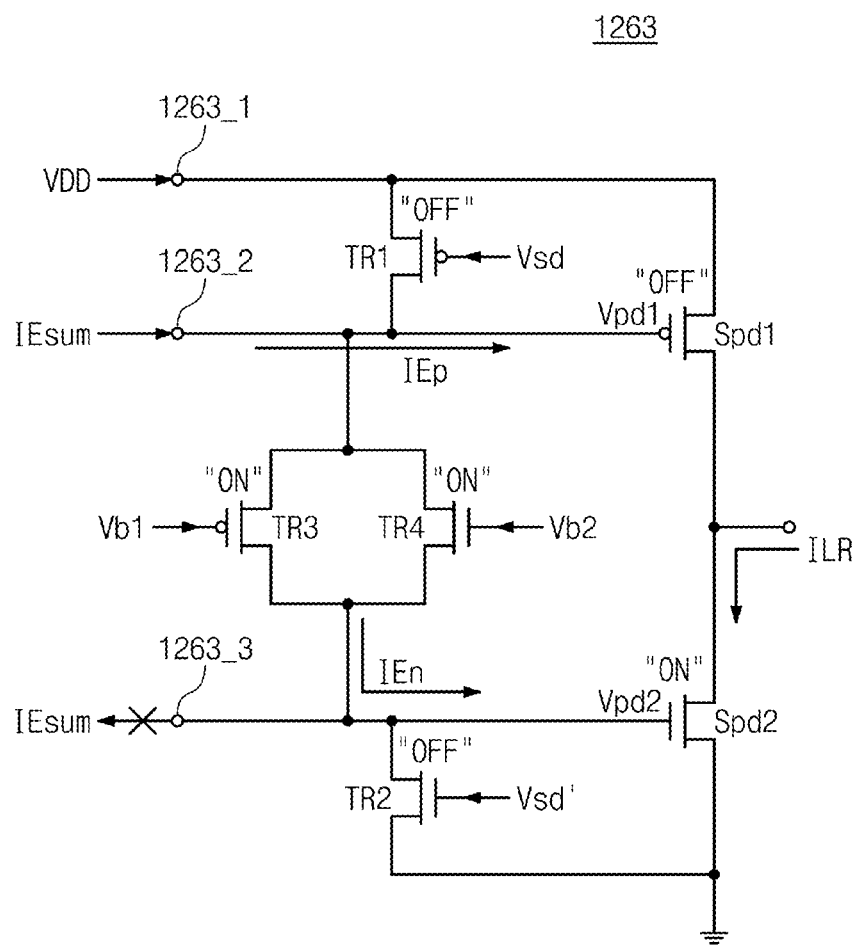
FIG. 14C is a circuit diagram illustrating an exemplary operation, in a higher transient state, of the current control unit illustrated in FIG. 13.

FIG. 14C is a circuit diagram illustrating an exemplary operation, in the higher transient state, of the current control unit 1263 illustrated in FIG. 13. In an embodiment of FIG. 14C, the current control signal Vsd may be the transient signal. Additionally, the first and second operation signals Vb1 and Vb2 may have high values.

The first and second control switches TR1 and TR2 may be turned off by the current control signal Vsd and the inverted current control signal Vsd'. The third and fourth control switches TR3 and TR4 may be turned on by the first and second operation signals Vb1 and Vb2. The error information current IEsum that is transmitted through the current transmission terminal 1263_3 may be cut off by the first to nth error amplifiers 1262_1 to 1262_4 of FIG. 12. Additionally, the error information current IEsum may be received through the current reception terminal 1263_2 to the current control unit 1263 by the first to nth error amplifiers 1262_1 to 1262_4.

The n-error information current IEn may be received from the current reception terminal 1263_2 through the third and fourth control switches TR3 and TR4 to the gate of the second cut-off switch Spd2 by the received error information current IEsum. Additionally, the p-error information current IEp may be received from the current reception terminal 1263_2 to the gate of the first cut-off switch Spd1. The error information current IEsum may include the p-error information current IEp and the n-error information current IEn. The magnitudes of the first and second cut-off voltages Vpd1 and Vpd2 may be increased by the received p-error information current IEp and n-error information current IEn.

As the magnitude of the first cut-off voltage Vpd1 increases, the first cut-off switch Spd1 may be turned off. As the magnitude of the second cut-off voltage Vpd2 increases, the second cut-off switch Spd2 may be turned on. The regulating current ILR may be received through the second cut-off switch Spd2 from at least one of the first to nth output loads 1310 to 1330 to the current control unit 1263.

Figure 15:
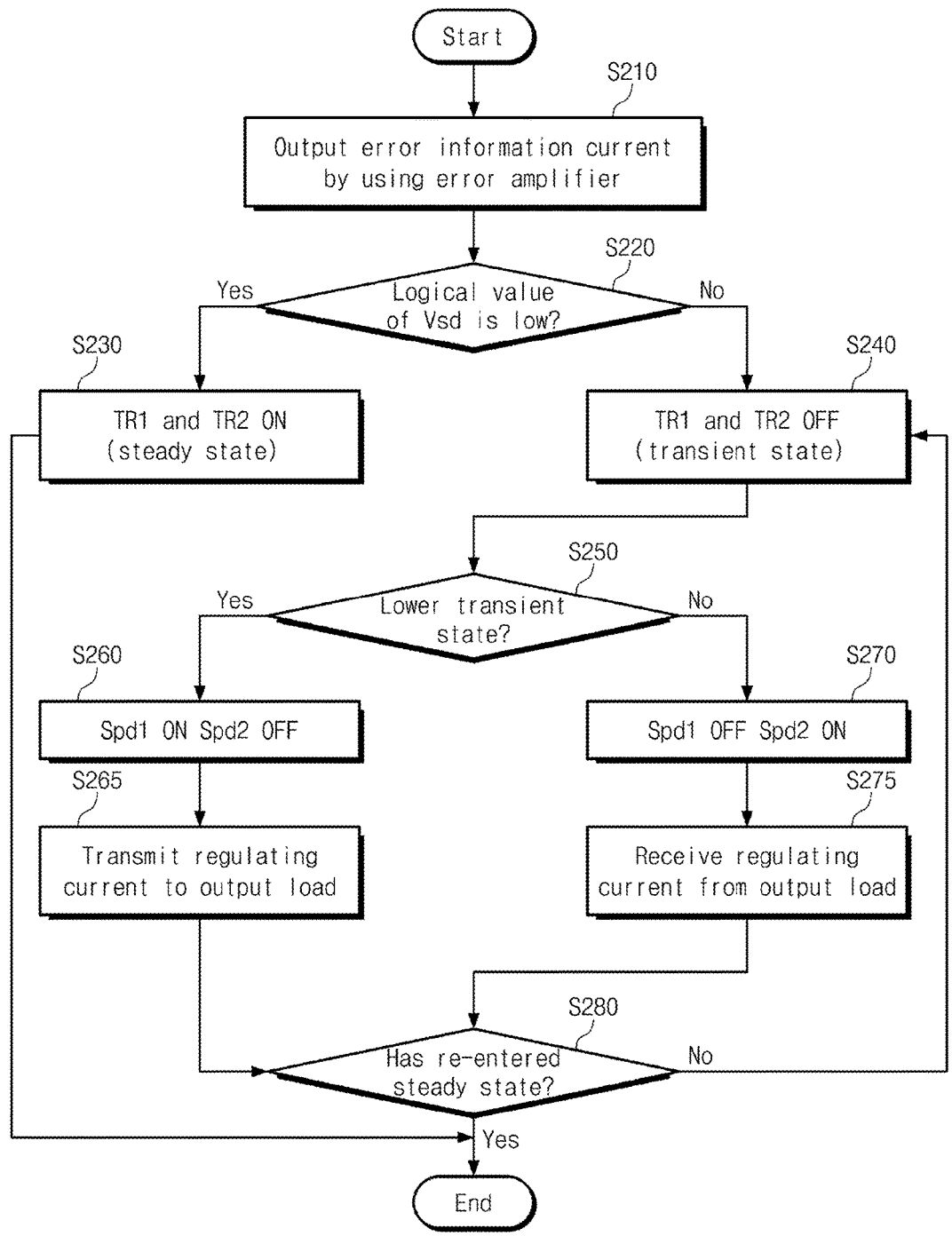
FIG. 15 is a flow chart illustrating an exemplary operation of the power-saving linear regulator unit designed according to some embodiments of the inventive concept.

FIG. 15 is a flow chart illustrating an exemplary operation of the power-saving linear regulator unit 1260 designed according to some embodiments of the inventive concept. For better understanding, FIG. 12 will be referred to together with FIG. 15.

In step S210, the first to nth error amplifiers 1262_1 to 1262_4 may compare the first to nth output voltages Vo1 to Von, and the first to nth reference voltages Vref1 to Vrefn respectively corresponding to the first to nth output voltages Vo1 to Von so as to output the error information current IEsum.

In step S220, the current control unit 1263 may receive the current control signal Vsd from the transient state determining unit 1270. As an example, in the case that the first to nth output voltages Vo1 to Von are in the steady state, the current control signal Vsd may have a low value. As an example, in the case that one of the first to nth output voltages Vo1 to Von is in the transient state, the current control signal Vsd may have a high value. When the current control signal Vsd has the low value, step 230 to be described below may be performed. When the current control signal Vsd has the high value, step 240 to be described below may be performed.

In step S230, each of the first to nth output voltages Vo1 to Von may be in the steady state. The first and second control switches TR1 and TR2 may be turned on in response to the low value of the current control signal Vsd, in the steady state (see FIG. 14A.). In the case that each of the first to nth output voltages Vo1 to Von is in the steady state, the operation of FIG. 15 may end.

In step S240, at least one of the first to nth output voltages Vo1 to Von may be in the transient state. The first and second control switches TR1 and TR2 may be turned off in response to the high value of the current control signal Vsd, in the transient state.

In step S250, the current control unit 1263 may receive the error information current IEsum from the first to nth error amplifiers 1262_1 to 1262_4. Alternatively, the current control unit 1263 may transmit the error information current IEsum to the first to nth error amplifiers 1262_1 to 1262_4. The error information current IEsum may be related to whether the type of the transient state that has occurred in step S240 is the lower transient state or the higher transient state. In the case that the type of the transient state that has occurred in step S240 is the lower transient state, step S260 to be described below may be performed. In the case that the type of the transient state that has occurred in step S240 is the higher transient state, step S270 to be described below may be performed.

In step S260, the error information current IEsum transmitted to the first to nth error amplifiers 1262_1 to 1262_4 may control the first and second cut-off voltages Vpd1 and Vpd2. The first cut-off switch Spd1 may be turned on by the first cut-off voltage Vpd1. The second cut-off switch Spd2 may be turned off by the second cut-off voltage Vpd2 (see FIG. 14B.).

In step S265, the current control unit 1263 may transmit the regulating current ILR to an output load in the lower transient state through the first cut-off switch Spd1 (see FIG. 14B.).

In step S270, the error information current IEsum received from the first to nth error amplifiers 1262_1 to 1262_4 may control the first and second cut-off voltages Vpd1 and Vpd2. The first cut-off switch Spd1 may be turned off by the first cut-off voltage Vpd1. The second cut-off switch Spd2 may be turned on by the second cut-off voltage Vpd2 (see FIG. 14C.).

In step S275, the current control unit 1263 may receive the regulating current ILR from an output load in the higher transient state through the second cut-off switch Spd2 (see FIG. 14C.).

In step S280, an output voltage that has been in the transient state may re-enter the steady state, or be still in the transient state. In the case that the output voltage is still in the transient state, step S240 may be performed again. In the case that the output voltage re-enters the steady state, the operation of FIG. 15 may end.

Figure 16:
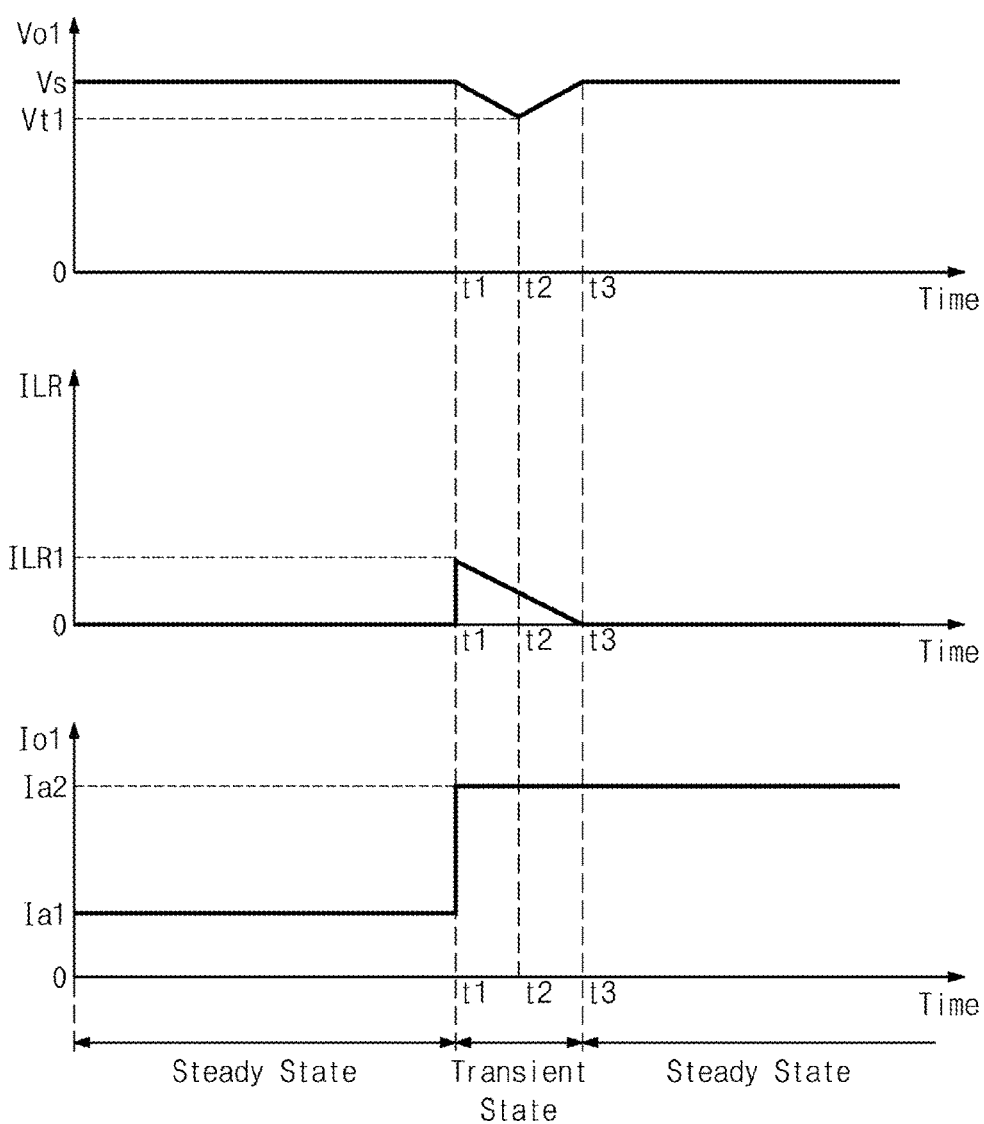
FIG. 16 is a graph showing the magnitudes of the first output voltage, a regulating current, and a first load current over time in the case that the lower transient state occurs in the first output voltage.

FIG. 16 is a graph showing the magnitudes of the first output voltage Vo1, the regulating current ILR, and the first load current Io1 over time in the case that the lower transient state occurs in the first output voltage Vo1. In the case that the lower transient state occurs in one of the second to nth output loads 1320 to 1330, the changes of the magnitudes of a voltage and currents are similar to those of the case that the lower transient state has occurred in the first output voltage Vo1, and thus, description thereof will not be given below.

Referring to FIG. 16, the first output voltage Vo1 may be in the steady state before timing t1. In the steady state before timing t1, the magnitude of the first output voltage Vo1 may be Vs, the magnitude of the regulating current ILR may be 0, and the magnitude of the first load current Io1 may be Ia1.

At timing t1, the magnitude of the first load current Io1 may increase from Ia1 to Ia2. According to the change of the first load current Io1, the first output voltage Vo1 may enter the lower transient state at timing t1. Accordingly, the magnitude of the first output voltage Vo1 may decrease from Vs to Vt1 between timing t1 and timing t2. Additionally, as the regulating current ILR is transmitted in the lower transient state, the magnitude of the regulating current ILR may increase from 0 to ILR1.

The first output voltage Vo1 may start to re-enter the steady state at timing t2. Accordingly, the magnitude of the first output voltage Vo1 may increase from Vt1 to Vs again between timing t2 and timing t3. Additionally, the magnitude of the regulating current ILR may decrease from ILR1 to 0 again between timing t1 and timing t3.

Here, the sign of a value of the regulating current ILR may mean the direction of the regulating current ILR. As an example, a positive value of the regulating current ILR may represent the regulating current ILR being transmitted from the power-saving linear regulator unit 1260 to the first output load 1310.

The first output voltage Vo1 may re-enter the steady state after timing t3, by the transmitted regulating current ILR. In the steady state, the transmission and reception of the regulating current ILR may be cut off. Accordingly, after timing t3, the magnitude of the first output voltage Vo1 may be Vs, the magnitude of the regulating current ILR may be 0, and the magnitude of the first load current Io1 may be Ia2.

Figure 17:
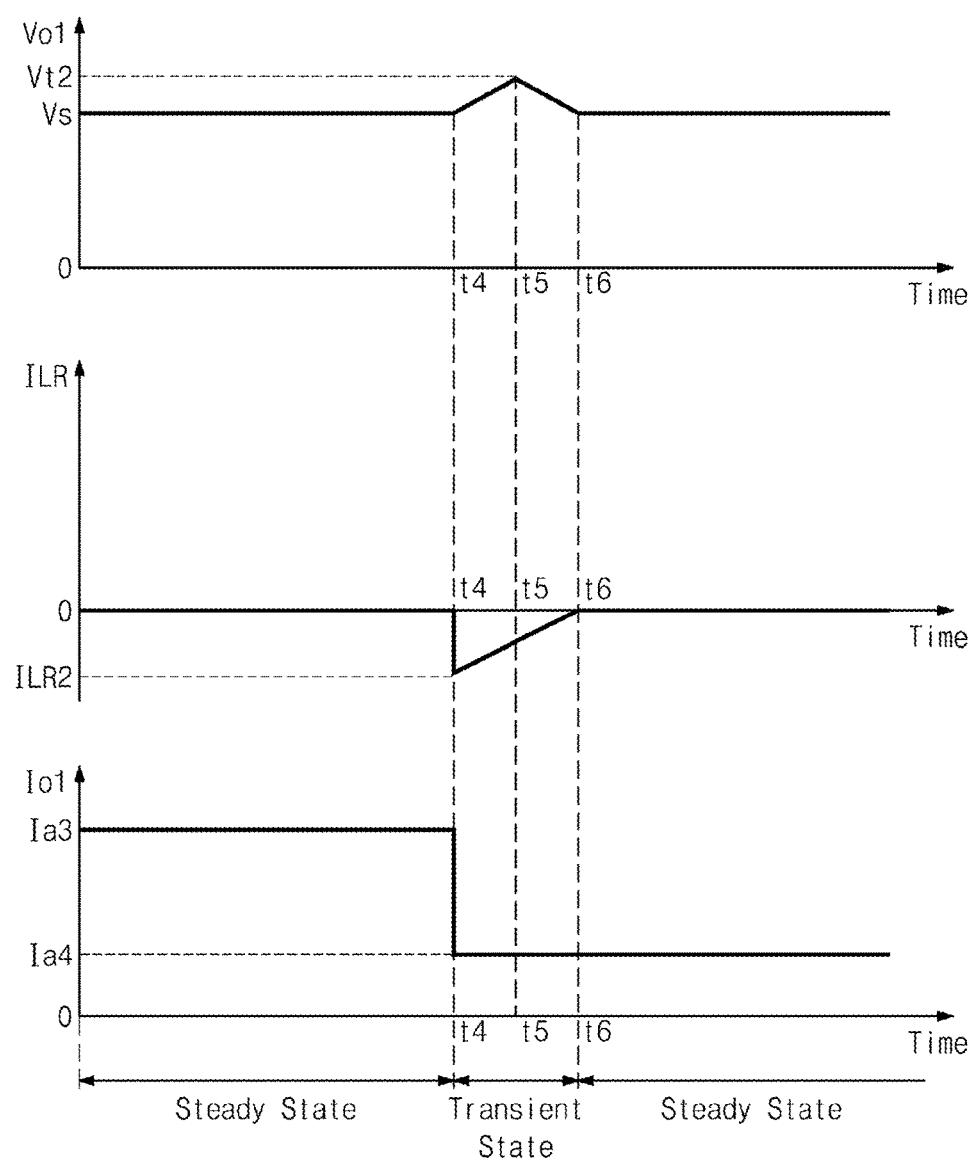
FIG. 17 is a graph showing the magnitudes of the first output voltage, the regulating current, and the first load current over time in the case that the higher transient state occurs in the first output voltage.

FIG. 17 is a graph showing the magnitudes of the first output voltage Vo1, the regulating current ILR, and the first load current Io1 over time in the case that the higher transient state occurs in the first output voltage Vo1. In the case that the higher transient state occurs in one of the second to nth output loads 1320 to 1330, the changes of the magnitudes of a voltage and currents are similar to those of the case that the higher transient state has occurred in the first output voltage Vo1, and thus, description thereof will not be given below.

Referring to FIG. 17, the first output voltage Vo1 may be in the steady state before timing t4. In the steady state before timing t4, the magnitude of the first output voltage Vo1 may be Vs, the magnitude of the regulating current ILR may be 0, and the magnitude of the first load current Io1 may be Ia3.

At timing t4, the magnitude of the first load current Io1 may decrease from Ia3 to Ia4. According to the change of the first load current Io1, the first output voltage Vo1 may enter the higher transient state at timing t4. Accordingly, the magnitude of the first output voltage Vo1 may increase from Vs to Vt2 between timing t4 and timing t5. Additionally, as the regulating current ILR is received in the higher transient state, the magnitude of the regulating current ILR may decrease from 0 to ILR2 at timing t4.

The first output voltage Vo1 may start to re-enter the steady state at timing t5. Accordingly, the magnitude of the first output voltage Vo1 may decrease from Vt2 to Vs again between timing t5 and timing t6. Additionally, the magnitude of the regulating current ILR may increase from ILR2 to 0 again between timing t4 and timing t6.

Here, the sign of a value of the regulating current ILR may mean the direction of the regulating current ILR. As an example, a negative value of the regulating current ILR may represent the regulating current ILR being received from the first output load 1310 to the power-saving linear regulator unit 1260.

The first output voltage Vo1 may re-enter the steady state after timing t6, by the received regulating current ILR. In the steady state, the transmission and reception of the regulating current ILR may be cut off. Accordingly, after timing t6, the magnitude of the first output voltage Vo1 may be Vs, the magnitude of the regulating current ILR may be 0, and the magnitude of the first load current Io1 may be Ia4.

According to some embodiments of the inventive concept, an electronic circuit, a linear regulating circuit, and a DC-DC converting circuit may be provided that consumes less power. Particularly, when output voltages are in the steady state, the power consumption of the electronic circuit, the linear regulating circuit, and the DC-DC converting circuit may be reduced, according to the control of a logic circuit for feeding back the output voltages. At the same time, a transient characteristic of the DC-DC converting circuit may be improved.

The description above presents specific embodiments for the inventive concept. The inventive concept will include not only exemplary embodiments described above, but also other embodiments that may be simply redesigned or easily modified into. Additionally, the inventive concept will include technologies that may be easily changed so as to be embodied in the future by using the embodiments described in detail.

What is claimed is:

1. An electronic circuit comprising: a comparison signal generator configured to compare output voltages with reference voltages to output comparison signals, the output voltages being from a device for voltage conversion, the reference voltages respectively corresponding to the output voltages, the comparison signals respectively corresponding to the output voltages, each of the comparison signals having a first logical value or a second logical value according to changes of the output voltages; and a logic circuit configured to output a transient signal or a steady signal depending on the first logical value or the second logical value of each of the comparison signals, the transient signal indicating that at least one of the output voltages is in a transient state, the steady signal indicating that each of the output voltages is in a steady state, wherein the output voltages are controlled based on the steady signal and the transient signal; and wherein the logic circuit comprises:

an input unit configured to output a sum signal depending on the first logical value or the second logical value of each of the comparison signals, the sum signal having a third logical value or a fourth logical value;

a first signal extending unit configured to extend a pulse width of the sum signal by a first length to output a first extended signal;

a flip-flop configured to receive the first extended signal, and to output the received first extended signal in response to a clock; and a first signal inverter configured to invert the output of the flip-flop to output a first inverted signal.

2. The electronic circuit of claim 1, wherein
the comparison signal generator comprises comparators configured to output the comparison signals for one cycle of a clock, each of the comparison signals having the first logical value or the second logical value, according to whether the reference voltages are respectively included in voltage ranges of the output voltages.

3. The electronic circuit of claim 1, wherein the first signal extending unit comprises: a first delay circuit configured to delay the clock by the first length to output a first delayed signal; and a first latch configured to output the first extended signal based on the sum signal and the first delayed signal.

4. The electronic circuit of claim 3, wherein the first extended signal
has a sixth logical value in response to the third logical value of the sum signal and a fifth logical value of the first delayed signal, has an eighth logical value in response to the fourth logical value of the sum signal and a seventh logical value of the first delayed signal, maintains a previous logical value in response to the fourth logical value of the sum signal and the fifth logical value of the first delayed signal, and has the sixth logical value in response to the third logical value of the sum signal and the seventh logical value of the first delayed signal.

5. The electronic circuit of claim 1, wherein the logic circuit further comprises a second signal extending unit configured to extend a pulse width of the first inverted signal by a second length to output a second extended signal.

6. The electronic circuit of claim 5, wherein the second signal extending unit comprises:
a second signal inverter configured to invert the first inverted signal to output a second inverted signal;

a second delay circuit configured to delay the second inverted signal by the second length to output a second delayed signal; and a second latch configured to output the second extended signal based on the first inverted signal and the second delayed signal.

7. The electronic circuit of claim 6, wherein the second extended signal has an eleventh logical value in response to a ninth logical value of the first inverted signal and a tenth logical value of the second delayed signal, has a fourteenth logical value in response to a twelfth logical value of the first inverted signal and a thirteenth logical value of the second delayed signal, maintains a previous logical value in response to the twelfth logical value of the first inverted signal and the tenth logical value of the second delayed signal, and has the eleventh logical value in response to the ninth logical value of the first inverted signal and the thirteenth logical value of the second delayed signal.

8. A linear regulating circuit comprising:
a linear regulator configured to transmit or receive a regulating current related to output voltages which are output through output terminals;
a comparison signal generator configured to compare the output voltages with reference voltages to output comparison signals respectively corresponding to the output voltages, the reference voltages respectively corresponding to the output voltages, each of the comparison signals having a first logical value or a second logical value according to changes of the output voltages; and
a logic circuit configured to output a transient signal or a steady signal depending on the first logical value or the second logical value of each of the comparison signals, the transient signal indicating that at least one of the output voltages is in a transient state, the steady signal indicating that each of the output voltages is in a steady state,
wherein the linear regulator does not transmit and receive the regulating current in response to the steady signal, and transmits or receives the regulating current in response to the transient signal.

9. The linear regulating circuit of claim 8, wherein the linear regulator comprises:
one or more error amplifiers configured to compare the output voltages and the reference voltages to output an error information current; and
a current controller configured to amplify the error information current to generate the regulating current.

10. The linear regulating circuit of claim 9, wherein
the current controller comprises a class-AB amplifier configured to amplify the error information current to generate the regulating current, and supplies the regulating current to at least one of output loads connected to the output terminals or receives the regulating current from at least one of the output loads.

11. A DC-DC converting circuit comprising:
a linear regulating circuit configured to:
generate a transient signal or a steady signal based on a first logical value or a second logical value generated according to a comparison result between output voltages and reference voltages, the output voltages being output from output terminals, the reference voltages respectively corresponding to the output voltages, the transient signal indicating that at least one of the output voltages is in a transient state, the steady signal indicating that each of the output voltages is in a steady state, and
control the output voltages based on the steady signal and the transient signal;
an energy storage configured to store energy used to generate the output voltages;
a ground switch configured to control connection between the energy storage and a ground terminal;
an input switch configured to control connection between at least one input terminal and the energy storage; and
an output switch configured to control connection between output loads and the energy storage, the output loads respectively corresponding to the output terminals.

12. The DC-DC converting circuit of claim 11, further comprising:
a switch controller configured to compare the output voltages and the reference voltages to control the ground switch, the input switch, and the output switch.

13. The DC-DC converting circuit of claim 11, wherein the ground switch connects the energy storage to the ground terminal when energy is being stored in the energy storage, and disconnects the energy storage from the ground terminal when the energy storage is being discharged.

14. The DC-DC converting circuit of claim 11, wherein the output switch comprises one or more switches configured to connect the energy storage to the output loads in a case where the energy storage and at least one of the output loads are exchanging energy, and to disconnect the energy storage from the output loads in a case where the energy storage and the output loads are not exchanging energy.

* * * * *